US008743876B2

(12) United States Patent
Fernandez Gutierrez

(10) Patent No.: US 8,743,876 B2
(45) Date of Patent: *Jun. 3, 2014

(54) EQUIPMENT IN A DATA NETWORK AND METHODS FOR MONITORING, CONFIGURING AND/OR MANAGING THE EQUIPMENT

(71) Applicant: Media Patents, S.L., Barcelona (ES)

(72) Inventor: Alvaro Fernandez Gutierrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/721,715

(22) Filed: Dec. 20, 2012

(65) Prior Publication Data

US 2013/0188498 A1      Jul. 25, 2013

Related U.S. Application Data

(63) Continuation of application No. 12/876,992, filed on Sep. 7, 2010, now Pat. No. 8,340,095, which is a continuation-in-part of application No. PCT/ES2009/070047, filed on Feb. 27, 2009.

(30) Foreign Application Priority Data

Mar. 5, 2008  (ES) ................... 200800646

(51) Int. Cl.
*H04L 12/28* (2006.01)
*H04L 12/56* (2006.01)
*G06F 15/173* (2006.01)

(52) U.S. Cl.
USPC ........................................... 370/390; 709/220

(58) Field of Classification Search
USPC .................... 370/390; 709/220, 223
See application file for complete search history.

*Primary Examiner* — Ronald Abelson
(74) *Attorney, Agent, or Firm* — Wiggin and Dana LLP; Gregory S. Rosenblatt

(57) ABSTRACT

There is provided a multicast router comprising a Simple Network Management Protocol (SNMP) agent and an SNMP database and a method of monitoring the router. In some embodiments the method comprises the multicast router receiving, via a downstream network interface, multicast data requests made by one or more hosts; the multicast router reading data contained in the multicast data request; the multicast router storing first data in the SNMP database for a downstream network interface, a multicast group address and a first host that requests multicast data, wherein the first data comprises information of the multicast groups and multicast channels requested by the first host; and the SNMP agent of the multicast router transmitting to an SNMP control station, using a version of the SNMP protocol, at least a part of the first data stored in the SNMP database.

5 Claims, 4 Drawing Sheets

EQUIPMENT IN A DATA NETWORK AND METHODS FOR MONITORING, CONFIGURING AND/OR MANAGING THE EQUIPMENT

CROSS-REFERENCE TO RELATED APPLICATIONS

This application is a Continuation of U.S. patent application Ser. No. 12/876,992 filed Sep. 7, 2010 (now U.S. Pat. No. 8,340,095) that is a Continuation-in-Part of International Application No. PCT/ES2009/070047 filed Feb. 27, 2009, which is a PCT application of Spanish Patent Application No. 200800646, filed Mar. 5, 2008, the disclosures of which are incorporated herein by reference.

TECHNICAL FIELD

The inventions relate to apparatus and methods for monitoring, managing and/or configuring equipment connected in data networks.

BACKGROUND

As data networks have been growing in equipment numbers, so has the complexity and diversity of the equipment connected. This has caused an increase in the difficulty and cost of monitoring, management and configuring data networks.

Standardized tools are needed to control these types of networks, tools that can be used with equipment from different manufacturers, including routers, switches and other telecommunication equipment, as well as computers or other final network equipment such as PDAs and mobile telephones. Hereinafter, the terms host or device will be used to refer to data network equipment.

As a response to this need, the "Simple Network Management Protocol" or SNMP was developed, which is a tool that allows the maintenance and configuration of network equipment from different manufacturers.

SNMP is a set of standards for managing network equipment. SNMP was adopted years ago as a standard for TCP/IP networks and has become the most widely used tool for managing networks and network-connected devices.

In 1991, a supplement was added to the SNMP, called Remote Network Monitoring (RMON). RMON extends SNMP capacities to include the management of local area networks (LANs) as well as managing the devices connected to those networks.

There are many updates and new versions of the SNMP protocol. In 1995 an update was published called SNMPv2. In 1998 the last version of this set of standards was published, called SNMPv3, which improved aspects related to security.

An SNMP management system may comprise the following elements:

At least one control or management station, traditionally called "SNMP Manager" or "management station". Henceforth, the term "control station" will be used to refer to an SNMP Manager or to other types of management systems.

Several nodes (potentially many), each of which uses one application, traditionally called an SNMP agent, to communicate with the control station. The SNMP agent has access to the configuration information for its node and can send and receive messages from the control station. Other types of management systems may use different types of agents.

A communications protocol to communicate between the control station and the SNMP agents. Other types of management systems may use other types of protocols.

SNMP agents manage the resources for nodes by using objects that represent these resources. The object is generally a variable with data that represents an aspect of the managed node. The set of objects for a specific network node is called the "Management Information Base" or MIB.

MIBs are standardized for each type of network device. For example, a particular MIB is used for various switches from different manufacturers.

An SNMP control station monitors the operation of equipment by obtaining the value of the objects found in the equipment's MIB. To do so, the SNMP control station communicates with the SNMP agent and requests that information.

An SNMP control station can also modify values from the objects found in this equipment's MIB, sending a message to the SNMP agent for that equipment so it modifies the values.

MIBs are specifications that contain definitions to manage and maintain information for a specific type of network equipment so that network equipment, even being from different manufacturers, can be monitored, configured and controlled remotely.

The rules that set the language used to write MIBs are defined in specifications RFC2578 (McCloghrie et al., Internet Engineering Task Force, Request for Comments 2578, "The structure of Management Information Version 2, SMIv2", April 1999, currently available on the Internet at http://www3.tools.ietf.org/html/rfc2578) and specifications RFC2579 (McCloghrie et al., Internet Engineering Task Force, Request for Comments 2579, "Textual Conventions for SMIv2", April 1999, currently available on the Internet at http://www3.tools.ietf.org/html/rfc2579).

SMIv2 uses a small part of the instructions from a language called Abstract Syntax Notation One (ASN.1).

ASN.1 is a formal, standardized language and is important to the SNMP protocol for many reasons. Firstly, it is used to specify data syntaxes. It is also used to define SNMP protocol messages, also called "Protocol Data Units" (PDUs). Lastly, it is used to define the MIB.

Although SNMP is the most widely used protocol to manage network devices, It has a few disadvantages.

The first disadvantage is the complexity. An overall view of the operation of SNMP protocols and the equipment which implements it is described in specifications RFC3411 (D. Harrington et al., Internet Engineering Task Force, Request for Comments 3411, "An Architecture for Describing Simple Network Management Protocol (SNMP) Management Frameworks", December 2002, currently available on the Internet at http://www3.tools.ietf.org/html/rfc3411). In Section 10, references for these RFC3411 specifications list another 22 RFC documents ("Request for Comments") that describe this operation of the SNMP protocol.

A sample of the complex nature of the SNMP protocol is the free software project "Net-SNMP" which is available at http://net-snmp.sourceforge.net/ which provides the source code for an SNMP agent. This source code may be downloaded for free and the available version in January 2008 for that SNMP agent totals 878 source code files using the C programming language (files ending in "c" or "h") incorporating a total of 316,435 lines of code.

This complexity is a problem for two reasons. The first problem is financial due to the time, knowledge and human resources needed to implement an SNMP agent. The second problem is technical due to the storage capacity and process capacity required by devices that have to incorporate SNMP agents. This technical resource problem is not a problem for equipment such as routers, switches or computers that have enough processing capacity to incorporate SNMP agents. However, this technical complexity is a problem for many other items of equipment that have less processing capacity and where also power consumption can be an important factor in their design, such as for example in mobile phones or in systems that are controlled by microcontrollers with limited memory and processing capacity.

Another limitation of the SNMP protocol is that the SNMP control station must establish a direct communication with every SNMP agent. This gives rise to many problems, as it increases the number of SNMP agents it must control. The first problem is that the SNMP control station can manage a limited number of SNMP agents and may not have sufficient processing capacity if the number of agents is many thousands or hundreds of thousands. The second problem is the amount of traffic generated in the network due to SNMP messages between the SNMP control station and SNMP agents as the number of managed devices grows.

A technology that could be used to solve these SNMP limitations is multicast technology. There are some scientific studies that investigate the use of multicast technology using the SNMP protocol.

The following document describes the practice of sending multicast packets between SNMP agents. Ehab Al-Hshaer, Yongning Tang. "*Toward Integrating IP Multicasting in Internet Network Management Protocols*". Computer Communications, Volume 24, Number 5, 15 Mar. 2001, pgs. 473-485, Publisher: Elsevier, currently available on the Internet on http://citeseer.ist.psu.edu/447658.html.

Multicast technology makes it possible to send data from only one source to many recipients over a data network, without having to establish unicast communications, which means a one-on-one communication between the source and each of the recipients. To do so, the source sends data, in the form of data packets, to only one address related to a multicast group to which the equipment interested in being recipients of the data may subscribe. This address, called the multicast address or the multicast group address, is an IP address (Internet Protocol) selected within a range that is reserved for multicast applications. Data packets that have been sent by the source to the multicast address are therefore replicated by the different network routers so that they reach the recipients that have joined the multicast group.

The messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively.

When there is a proxy between the host and the router, the proxy also uses the IGMP/MLD protocols to exchange with the host, the closest router or other intermediate proxy, the multicast group membership messages. In these cases, the proxy can receive from different hosts requests to subscribe to or to unsubscribe from a multicast group, and it assembles them to thus reduce IGMP/MLD message traffic it sends to the router. Hereinafter, the generic term IGMP proxy will be used to designate a proxy using the IGMP/MLD protocols.

In addition, routers exchange messages with one another for the purpose of defining the routing which allows efficiently routing the data from the sources to the hosts that have subscribed to a multicast group. To that end, the routers use specific protocols, including the very well known PIM-SM (Protocol Independent Multicast-Sparse Mode).

All the mentioned protocols are defined and documented by the Internet Engineering Task Force (IETF).

The IGMP protocol version currently being used is IGMPv3, which is described in the RFC 3376 specifications published on line by the IETF (B. Cain et al., Engineering Task Force, Network Working Group, Request for Comments 3376, October 2002; currently available at Internet address http://tools.ietf.org/html/rfc3376).

With regard to the MLD protocol, the version currently being used is MLDv2, which is described in the RFC 3810 specifications published on line by the IETF (R. Vida et al., Engineering Task Force, Network Working Group, Request for Comments 3810, June 2004; currently available at Internet address http://tools.ietf.org/html/rfc3810).

The operation of an IGMP proxy is described in the RFC 4605 specifications published on line by the IETF (B. Fenner et al., Engineering Task Force, Network Working Group, Request for Comments 4605, August 2006; currently available at Internet address http://tools.ietf.org/html/rfc4605).

The PIM-SM protocol used for the communication between routers is described in the RFC 4601 specifications published on line by the IETF (B. Fenner et al., Engineering Task Force, Network Working Group, Request for Comments 4601, August 2006; currently available at Internet address http://tools.ietf.org/html/rfc4601).

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet.

Multicast technology was then implemented to be applied to the one-to-many communication model known as SSM (Source Specific Multicast), in which a single source sends data for many recipients. Radio and television via Internet are SSM applications. This is why SSM is currently very interesting.

In earlier IGMP protocol versions, a host could not choose the data sending sources it wanted to subscribe to within a multicast group, rather the host could only subscribe to or unsubscribe from the group for all the sources. The messages a host sent to a router were very simple: Join (G) to receive traffic from the multicast group G and Leave (G) to stop receiving it. Therefore, earlier IGMP protocol versions did not allow SSM, where hosts can choose the multicast data sources.

The possibility that the hosts could choose the sources within a multicast group was introduced in the IGMPv3 version of the IGMP protocol to allow SSM. To that end, a host can send IGMP messages containing data blocks referred to as Group Record in which the host defines the sources from which traffic is to be received for each multicast group. These Group Record data blocks in an IGMP message can be of several types:

An INCLUDE type Group Record data block containing information on source IP addresses from which the host wishes to receive data sending. According to the terminology of the RFC 3376 specifications, the sources chosen by means of an IGMP message containing an INCLUDE type Group Record are referred to as INCLUDE sources.

An EXCLUDE type Group Record data block, containing information on source IP addresses from which the host does not wish to receive data sending. In this case, it is interpreted that the host wishes to receive data sent by all the sources of said multicast group except the sources indicated as excluded in the message. According to the terminology of the RFC 3376 specifications, the excluded sources by means of an IGMP message containing an EXCLUDE type Group Record are referred to as EXCLUDE sources.

For clarity's sake, the term INCLUDE message will be used hereinafter to designate an IGMP message containing an INCLUDE type Group Record, and the term EXCLUDE message will be used hereinafter to designate an IGMP message containing an EXCLUDE type Group Record.

It was decided in the IGMPv3 version that each network interface could operate for each multicast group only in one of the following two modes, being able to switch from one to the other: an INCLUDE mode in which the network interface defines an INCLUDE source list or an EXCLUDE mode in which the network interface defines an EXCLUDE source list.

Each network interface and multicast group has a state record storing the information on said interface and group and said state record contains a field referred to as filter-mode which can only be of the INCLUDE type, containing only INCLUDE sources, or of the EXCLUDE type, containing only EXCLUDE sources. The rules that are transcribed below are applied when the network interface record must result from the combination of different records:

Rule 1. If any of the data sources of a group G1 is EXCLUDE, then the network interface will have an EXCLUDE filter-mode for the group G1 and the source list of the network interface is the intersection of the EXCLUDE source lists minus the sources of the INCLUDE lists.

Rule 2. If all the sources are INCLUDE type sources, then the network interface will have an INCLUDE filter-mode for the group G1 and the source list is the union of all the INCLUDE sources.

These rules are applied in a network interface of equipment operating as an IGMP proxy and receiving INCLUDE messages or EXCLUDE messages from different hosts or from different IGMP proxies located on the downstream side of the network interface (i.e. in the direction going from the router to the hosts). These same rules are also applied in a network interface of equipment, such as a personal computer for example, provided with several sockets receiving different INCLUDE source or EXCLUDE source requests from different applications.

Channel (S, G) is used hereinafter, and according to the common nomenclature in SSM technology, to refer to the sending of source S of the multicast group G.

In the current state of the art, to save memory, routers using the IGMPv3 protocol store only the minimum multicast traffic information that they must transmit. This minimum information consists of storing, for each network interface of the router and multicast group, a state reflecting if, for a specific channel (S,G) or multicast group (*,G) there is at least one host interested in receiving said multicast traffic.

SUMMARY

According to one or more implementations processes and apparatus to monitor and/or manage equipment connected to a data network are provided where:
  the data network is equipped with a control station that monitors and/or manages the equipment,
  the equipment may be in one or many different states,
  the equipment sends messages using a multicast routing protocol to request the receipt of multicast traffic,
  the requested multicast traffic consists of multicast groups and multicast channels that correspond to the status of each equipment,
  the control station knows the status of equipment from the multicast groups and multicast channels requested for each item of equipment.

According to one or more implementations processes and apparatus to monitor and/or manage equipment connected to a data network are provided where:
  there is at least on multicast router in the data network connected to the equipment,
  the equipment sends messages using a multicast routing protocol to the multicast router,
  a multicast router transmits the multicast group and multicast channel information requested by the equipment to the control station.

In one or more implementations the control station sends to at least one of the equipment, information to configure or modify the status of the equipment.

In one or more implementations a router connected to the equipment is an IGMP router.

In one or more implementations a router that transmits the information to this control station is a PIM-SM router.

In one or more implementation processes are provided that comprise a multicast router transmitting this information to the control station, the multicast router having an SNMP agent, and the information is stored in an MIB database and is transmitted to the control station using an SNMP protocol. In one or more implementations the IGMP router takes the information about the multicast groups and channels requested by the equipment and stores it in records associated with the IGMP protocol, associating the multicast groups and channels requested by each item of equipment with an identifier from each item of equipment.

In one or more implementations the IGMP router stores this information from multicast groups and channels requested by each equipment in an MIB database.

In one or more implementations the IGMP router transmits the information stored in each MIB database to the control station.

In one or more implementations the IGMP router transmits the information stored in the MIB database using the SNMP protocol.

In one or more implementations methods are provided in which a PIM-SM router that transmits the information to the control station is an improved PIM-SM router that stores in records associated with the PIM-SM protocol, the information from the multicast groups and channels requested by each multicast router, associating the multicast groups and channels to an identifier from each router requesting those multicast groups and channels.

In one or more implementations the PIM-SM router stores this information from multicast groups and channels, requested by each multicast router in an MIB database.

In one or more implementations the PIM-SM router transmits the information stored in each MIB database to the control station.

In one or more implementations the PIM-SM router transmits the information using the SNMP protocol.

In one implementation a router is provided having one or more downstream interfaces and situated in a data network system between sources that send multicast data packets to at least one multicast group address and multiple hosts that request data from the multicast group address and sources, the router having a management system agent and an associated management system agent database, the router storing for each network interface, each multicast group address and each host information in the management system agent database derived from one or more data requests made by the hosts. In one implementation the management system agent is a SNMP agent and the associated management system agent database is an SNMP database.

In one implementation a router is provided having one or more downstream network interfaces and situated in a data network system between sources that send multicast packets to at least one multicast group address and one or more hosts that request data from the multicast group address and the sources, the router having a management system agent and an associated management system agent database, the router storing for a downstream network interface and multicast group address at least one INCLUDE source record containing information about include source lists derived by data requests made by the one or more hosts and at least one EXCLUDE source record containing information about exclude source lists derived by data requests made by the one or more hosts in the management system agent database, the router using a host-router multicast routing protocol based on the IGMP (Internet Group Management Protocol) or the MLD (Multicast Listener Discovery) protocol to communicate with the one or more hosts, the router using a different protocol to communicate with a management system control station information stored in the management system database. In one implementation the management system agent is a SNMP agent, the associated management system agent database is a SNMP database, the different protocol is based on the SNMP (Simple Network Management Protocol), and the management system control station is a SNMP control station.

In one implementation a process is implemented in a router having one or more downstream network interfaces and situated in a data network system between sources that send multicast packets to at least one multicast group address and one or more hosts that request data from the multicast group address and the sources, the router having a management system agent and an associated management system agent database, the router storing for a downstream network interface and a multicast group address at least an INCLUDE record having an include source list containing a source or set of sources derived by data requests made by the one or more hosts and at least an EXCLUDE record having a requested list containing a source or set of sources and an exclude list containing a source or set of sources derived by data requests made by the one or more hosts in the management system agent database, the process comprising modifying the INCLUDE record upon receiving a MODE_IS_INCLUDE type message from a host without modifying the EXCLUDE record. In one implementation the process further comprises transmitting by use of the management system agent information from the management system agent database to a management system agent control station. In one implementation the management system agent is a SNMP agent, the associated management system agent database is a SNMP database and the management system control station is a SNMP control station.

In one implementation method is provided for updating a database associated with a management system agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface a MODE_IS_INCLUDE message having an include source list containing a source or set of sources B of the multicast group address and; changing the INCLUDE record source list to contain the union of the sources or sets of sources A and B (A+B) without modifying the EXCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a process is implemented in a router having one or more downstream network interfaces and situated in a data network system between sources that send multicast packets to at least one multicast group address and one or more hosts that request data from the multicast group address and the sources, the router having a management system agent and an associated management system agent database, the router storing for a downstream network interface and a multicast group address at least an INCLUDE record having an include source list containing a source or set of sources derived by data requests made by the one or more hosts and an EXCLUDE record having a requested list containing a source or set of sources and an exclude list containing a source or set of sources derived by data requests made by the one or more hosts in the management system agent database, the process comprising modifying the EXCLUDE source record upon receiving a MODE_IS_INCLUDE type message from a host without modifying the INCLUDE record. In one implementation the process further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for updating a database associated with a management system agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface a MODE_IS_EXCLUDE message having an exclude source list containing a source or set of sources B of the multicast group address and; changing the EXCLUDE record source list to have a requested list containing the set of sources B minus the sources of B that are also in the set of sources Y (B-Y) and an exclude list containing the intersection of the sets of sources Y and B (Y*B) without modifying the INCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a method is provided for updating a database associated with a management system agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an ALLOW message containing a source or set of sources B of the multicast group address and; changing the INCLUDE record source list to contain the union of the sources or sets of sources A and B (A+B) without modifying the EXCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a method is provided for updating a database associated with a management system agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an ALLOW type message containing a source or set of sources B of the multicast group address and; changing the INCLUDE record source list to contain the union of the sources or sets of sources A and B (A+B) without modifying the EXCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a method is provided for updating a database associated with a management system agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an ALLOW type message containing a source or set of sources B of the multicast group address and; changing the EXCLUDE record source list to have a requested list containing the union of the set of sources X and B (X+B) and an exclude list containing the set of sources Y minus the set of sources Y that are also in the set of sources B (Y−B) without modifying the INCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a method is provided for updating a database associated with a management system agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface a BLOCK type message containing a source or set of sources B of the multicast group address and in response not modifying the INCLUDE or the EXCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a method is provided for updating a database associated with a management agent of a router having one or more downstream network interfaces, the database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an BLOCK type message containing a source or set of sources B of the multicast group address and; changing the EXCLUDE record source list to have a requested list containing the union of the set of sources X and the set of sources B minus the set of B sources that are also in the set of sources Y (X+(B−Y)) and an exclude list containing the set of sources Y without modifying the INCLUDE record. In one implementation the process further comprises transmitting by use of the management system agent information from the database to a management system agent control station. In one implementation the management system agent is a SNMP agent, the database is a SNMP database and the management system control station is a SNMP control station.

In one implementation a process is implemented in a router having one or more downstream network interfaces and situated in a data network system between sources that send multicast packets to at least one multicast group address and one or more hosts that request data from the multicast group address and the sources, the router having a management system agent and an associated management system agent database, the router storing for a downstream network interface and a multicast group address at least an INCLUDE record having an include source list containing a source or set of sources derived by data requests made by the one or more hosts and an EXCLUDE record having a requested list containing a source or set of sources and an exclude list containing a source or set of sources derived by data requests made by the one or more hosts in a first memory not associated with the management system agent and in the management system agent database, the process comprising modifying the INCLUDE record upon receiving a MODE_IS_INCLUDE type message from a host without modifying the EXCLUDE record. In one implementation the process further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for updating a state transition table of a router having one or more downstream network interfaces, the router having a management system agent and an associated management system agent database, the transition table and management system agent database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface a MODE_IS_INCLUDE message having an include source list containing a source or set of sources B of the multicast group address and; changing the INCLUDE record source list to contain the union of the sources or sets of sources A and B (A+B) without modifying the EXCLUDE record. In one implementation the method further comprises transmitting by use of the management system agent information from the management system agent database to a management system agent control station. In one implementation the management system agent is a SNMP agent, the associated management system agent database is a SNMP database and the management system control station is a SNMP control station.

In one implementation a process is implemented in a router having one or more downstream network interfaces and situated in a data network system between sources that send multicast packets to at least one multicast group address and one or more hosts that request data from the multicast group address and the sources, the router having a management system agent and an associated management system agent database, the router storing for a downstream network interface and a multicast group address at least an INCLUDE record having an include source list containing a source or set of sources derived by data requests made by the one or more hosts and an EXCLUDE record having a requested list containing a source or set of sources and an exclude list containing a source or set of sources derived by data requests made by the one or more hosts in a first memory not associated with the management system agent and in the management system agent database, the process comprising modifying the EXCLUDE source record upon receiving a MODE_IS_INCLUDE type message from a host without modifying the INCLUDE record. In one implementation the process further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for updating a state transition table of a router that receives multicast packets from one or more multicast group addresses and having one or more downstream network interfaces, the router having a management system agent and an associated management system agent database, the state transition table and management system agent database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface a MODE_IS_EXCLUDE message having an exclude source list containing a source or set of sources B of the multicast group address and; changing the EXCLUDE record source list to have a requested list containing the set of sources B minus the sources of B that are also in the set of sources Y (B−Y) and an exclude list containing the intersection of the sets of sources Y and B (Y*B) without modifying the INCLUDE record. In one implementation the method further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for updating a state transition table of a router that receives multicast packets from one or more multicast group addresses and having one or more downstream network interfaces, the router having a management system agent and an associated management system agent database, the state transition table and management system agent database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an ALLOW message containing a source or set of sources B of the multicast group address and; changing the INCLUDE record source list to contain the union of the sources or sets of sources A and B (A+B) without modifying the EXCLUDE record. In one implementation the method further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for updating a state transition table of a router that receives multicast packets from one or more multicast group addresses and having one or more downstream network interfaces, the router having a management system agent and an associated management system agent database, the state transition table and management system agent database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an ALLOW type message containing a source or set of sources B of the multicast group address and; changing the EXCLUDE record source list to have a requested list containing the union of the set of sources X and B (X+B) and an exclude list containing the set of sources Y minus the set of sources Y that are also in the set of sources B (Y−B) without modifying the INCLUDE record. In one implementation the method further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for maintaining a state transition table of a router that receives multicast packets from one or more multicast group addresses and having one or more downstream network interfaces, the router having a management system agent and an associated management system agent database, the state transition table and the management system agent database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface a BLOCK type message containing a source or set of sources B of the multicast group address and in response not modifying the INCLUDE or the EXCLUDE record. In one implementation the method further comprises transmitting by use of the management system agent information from the management system agent database to a management system agent control station. In one implementation the management system agent is a SNMP agent, the associated management system agent database is a SNMP database and the management system control station is a SNMP control station.

In one implementation a method is provided for updating a state transition table of a router that receives multicast packets from one or more multicast group addresses and having one or more downstream network interfaces, the router having a management system agent and an associated management system agent database, the state transition table and the management system agent database storing for a particular downstream network interface and a particular multicast group address an INCLUDE record having an include source list containing a source or set of sources A and an EXCLUDE record having a requested list containing a source or set of sources X and an exclude list containing a source or set of sources Y, the method comprising: receiving through the particular downstream network interface an BLOCK type message containing a source or set of sources B of the multicast group address and; changing the EXCLUDE record source list to have a requested list containing the union of the set of sources X and the set of sources B minus the set of B sources that are also in the set of sources Y (X+(B−Y)) and an exclude list containing the set of sources Y without modifying the INCLUDE record. In one implementation the method further comprises transmitting by use of the management system agent information from the management system agent database to a management system agent control station. In one implementation the management system agent is a SNMP agent, the associated management system agent database is a SNMP database and the management system control station is a SNMP control station.

BRIEF DESCRIPTION OF THE DRAWINGS

Other advantages and characteristics can be seen from the following description, which includes, without any limitations, some implementations, referencing the attached drawings.

DETAILED DESCRIPTION

According to one implementation a management method is provided for devices connected to a network using a control station connected to this network through a new use of multicast routing protocols.

In one implementation the control station knows the status of the devices from the multicast groups and channels that each device has requested to receive. In one implementation this involves the use of messages that belong to multicast routing protocols as a communication medium from devices to the control station.

In one implementation some devices send multicast routing protocol messages that request to receive multicast traffic to a control station that receives the multicast traffic information that each device has requested to receive. In one implementation the function of these multicast traffic requests is to transmit information about the status of each device to the control station without a need for the control station to transmit this information to the devices.

Multicast routing protocols have been conceived and designed to transmit multicast traffic and not to enable devices to notify a control station about its status so that the control station knows the status of each device from the multicast groups and channels requested by each device. However, this new use of multicast protocols has some advantages such as reducing the complexity of the control systems that the devices incorporate, enabling reuse of already existing networks and reducing the management traffic circulating over the networks.

For discussion and descriptive purposes the following description uses as examples the two multicast routing protocols that are currently most widespread: the IGMP protocol for host-router multicast routing messages and the PIM-SM protocol for multicast routing messages between routers. However, other multicast routing protocols can be equally applied.

According to some implementations a control station "monitors" a device when the control station receives information from the device that informs the status of the device, but the control station does not send information to the device with the purpose of configuring it or modifying its status. During the device monitoring process, the control station may also send information to the device so that the device receives a confirmation that its multicast traffic request messages have reached the control station. However, this information is not used to configure the device but to notify it that its messages have arrived correctly.

According to some implementations the control station "manages" a device when the control station not only receives information from the device, but also sends information to the device with the purpose of configuring or changing its status.

Figure 1:
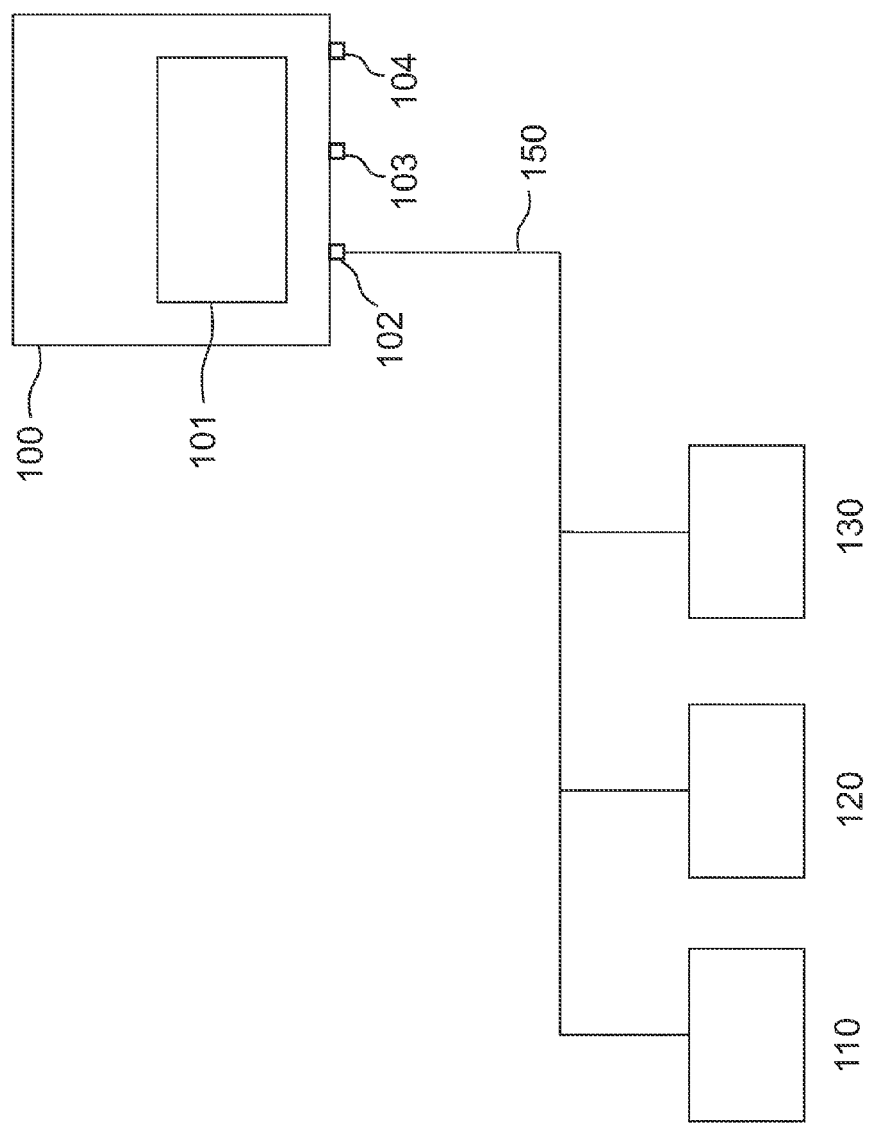
FIG. 1 illustrates an exemplary system according to implementations where a control station monitors and manages devices in a data network.

FIG. 1 illustrates an exemplary implementation where there are three devices 110, 120 and 130 connected to a multi-access data network 150, such as, for example an Ethernet network. A control station 100 is connected to the network 150. For discussion purposes the control station 100 will be considered to have an IP address IP100. In one implementation the control system 100 includes a router 101 (e.g. IGMP router) that is responsible for requesting the information about the devices according to a multicast routing protocol, such as, for example the IGMPv3 protocol. The control system 100 also has a plurality of network interfaces 102, 103 and 104.

In one implementation one or more of the devices of FIG. 1 include a system or systems compatible with implementing the implementations disclosed and contemplated herein. The one or more systems may be implemented, for example, by means of specialized hardware, included in the devices, in communication with a network card to allow access to the multi-access network 150, which may be a physical network that uses cables or a wireless network, like WIFI or WIMAX for example.

The devices in FIG. 1 can be any type of device, such as computers, mobile phones, or any other devices connectable to a data network. As one example, devices 110, 120 and 130 will be considered traffic signs used to regulate vehicle traffic.

In the example of Table 1, a number of statuses have been defined with the purpose of managing the proper operation of the devices. Table 1 explains the different states and the multicast group or channel associated to each status.

TABLE 1

Example of status for a device and associated multicast groups and channels.

| Status | Meaning | Group or Channel |
|---|---|---|
| 0 | The traffic lights have all lights turned off | Gi |
| 1 | The traffic lights has one green light turned on | (Si, G1) |
| 2 | The traffic lights have one orange light turned on | (Si, G2) |
| 3 | The traffic lights have one red light turned on | (Si, G3) |
| 4 | The green light is damaged | (Si, G4) |
| 5 | The orange light is damaged | (Si, G5) |
| 6 | The red light is damaged | (Si, G6) |
| 7 | The orange light is blinking | (S1, G7) |
| 8 | There is an error in the power supply of the traffic lights. | (S1, G8) |
| 9 | The management module is operating correctly | (IP100, Gi), G9 |

In one implementation devices 110, 120 and 130 from FIG. 1 send IGMPv3 messages to the control station 100. In one implementation these messages include the multicast groups and multicast channels that correspond to the status where each device is found, and as a result, the control station 100 knows the status of each device.

In one implementation a particular device i (in FIG. 1, i can be 110, 120 or 130) can send six types of IGMP messages: IGMP messages requesting four types of multicast channels and IGMP messages requesting two types of multicast groups:

Messages such as (Si, Gi), where the Si data source and the Gi multicast group are only used by the device i.

Messages such as (Si, G1) where the Si data source is used only by the device i but the G1 multicast group is used by many devices.

Messages such as (S1, Gi) where the S1 source is used by many devices but the Gi group is used only by the device i.

Messages such as (S1, G7) where both the S1 data source and the G7 group are used by all devices.

Gi type messages, where the Gi multicast group is used only by the device i.

G9 type messages, where the G9 multicast group is used by all devices.

The type of messages used for each status can be selected according to the devices and also according to the multicast data network to which the devices are connected. The correct selection of the message type enables the control system to operate in a hierarchical way in multicast networks that use different types of multicast equipment such as PIM-SM routers, IGMP routers and IGMP Proxies.

With continued reference to FIG. 1, and for the purpose of discussion, state 0 in Table 1 uses a Gi multicast group which is unique to the device i. Further, devices 110, 120 and 130 are assigned the multicast groups G110, G120 and G130, respectively.

The concept of oneness must be understood in the sense of a multicast routing domain. For example, data networks that are not connected with each other that can use the same Gi, even though it is the same multicast group, is unique for each network.

In statuses 1 to 6, the Si source of the multicast channel is different for each device. Devices 110, 120 and 130 have assigned the multicast data sources S110, S120 and S130 respectively.

In status 7, the multicast channel (S1, G7) is used, where both source S1 and multicast group G7 are the same for all devices.

In status 8, all of the devices use the same multicast channel (S1, G8), where S1 is an IP address of the data network, selected so that the multicast traffic requests always reach the control station.

In status 9, each device has assigned a common multicast group G9 for all devices and a multicast channel (IP100,Gi) where IP100 is the IP address of the control station 100 and is therefore common to all devices, and Gi is different for each device. The devices 110, 120 and 130 have assigned the multicast groups G110, G120 and G130, respectively.

Status 9 is used by the devices to indicate to that the device is compatible with the control system and that it is operating correctly. In one implementation the devices always request to receive of the multicast channel (IP100, Gi) and the multicast group G9.

This property may be used by the control system 100 to send data to all of the devices or to one specific device. The control system 100 can send personalized data to some devices 110, 120 or 130, sending IP packets through multicast channels (IP100,G110), (IP100, G120) and (IP100, G130) respectively.

If the control system wishes to send data to all of the devices on the network 150, it can send IP packets using the multicast group G9 as a target IP address for the IP packets. This is also applicable to a network with thousands or millions of devices and enables a data traffic saving in the network as the control system has to send multicast packets only once independently of the number of devices that are connected to the network 150.

In one implementation in a control system that only monitors devices it is not necessary to send packets from the control station to the monitored devices. This transmission of information is necessary when the control station needs to manage the devices, such as updating its configuration.

In the example of Table 1 there are some statuses that are not compatible between each other and others that are compatible with each other. For example, status 0, all lights off, is not compatible with status 1, 2 and 3. However, status 1 and 5 are compatible because a device can have both statuses at the same time, meaning green light on and orange light damaged.

As a result of the assignment of multicast groups and channels that correspond to the different status of a device, the implementations disclosed and contemplated herein enables devices connected to the network to be monitored and managed in a much simpler manner than with the current SNMP protocol.

It is also possible that a device wants to receive multicast traffic (Sx, Gy) through the data network, for example to receive a configuration table needed to operate the device, or for some other reason. In this case, the control station knows that the device wants to receive the multicast channel (Sx, Gy) that does not correspond to any of the status established in Table 1 of this device, and allows the multicast routing procedures of the data network to reach the multicast channel (Sx, Gy) of the Sx source for the device. Even so, the control station is also monitoring this multicast traffic received by the device. If the IGMP router 101 implemented in the control station is the "Designated Router" in the sense used in the IGMPv3 specifications, in the network 150, then the router 101 itself transmits the multicast traffic (Sx, Gy).

Figure 2:
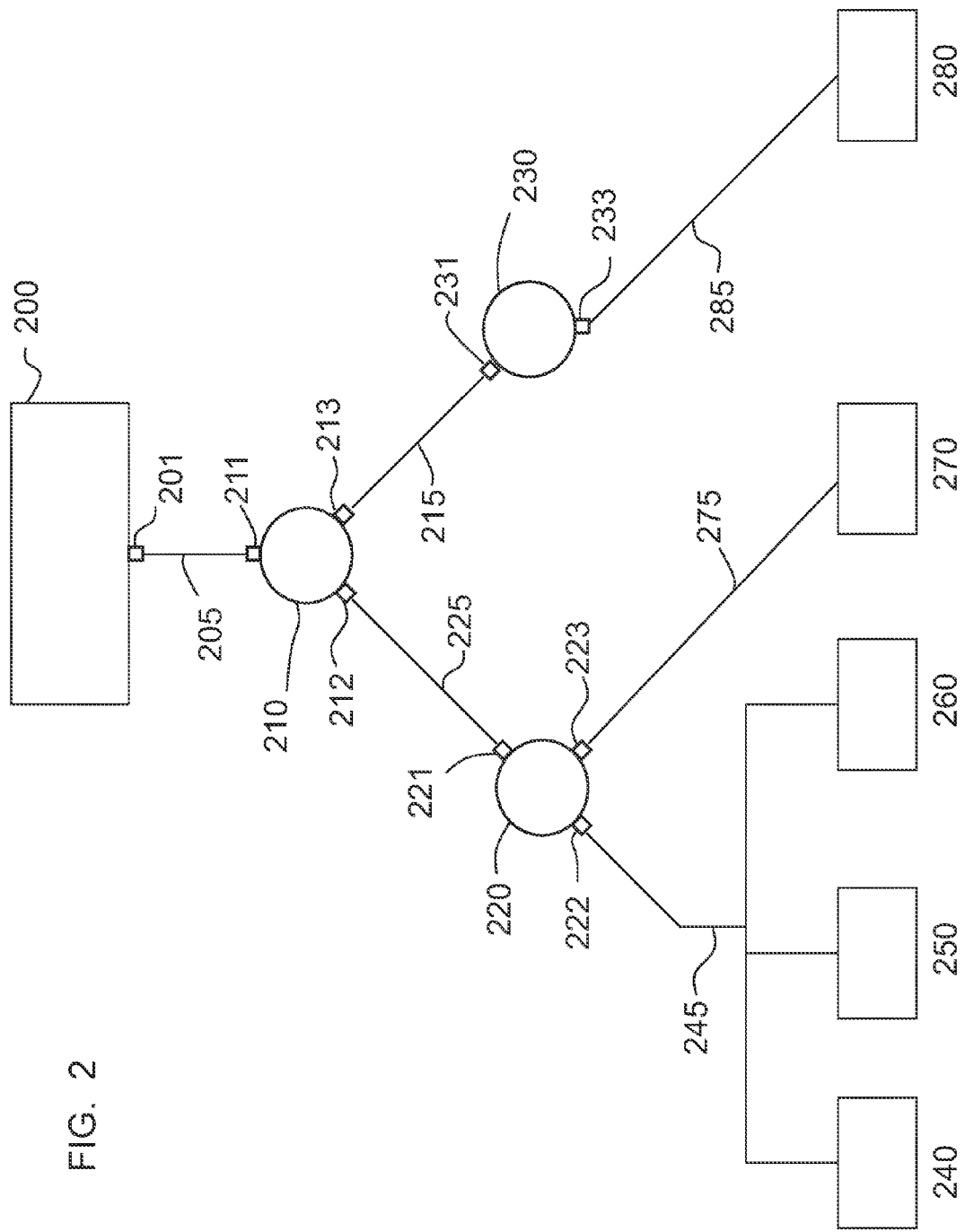
FIG. 2 illustrates an exemplary system according to implementations operating in a multicast data network having IGMP routers and PIM-SM routers.

FIG. 2 illustrates a multicast network comprising, for example, current state of the art IGMP routers and PIM-SM routers. The example of FIG. 2 has a plurality of network devices that are monitored and managed from a control station 200 which is connected to the network 205 through a network interface 201.

In one implementation multicast router 210 uses the PIM-SM protocol and communicates with the control station 200 through its network interface 211 connected to the network 205. In one implementation multicast router 210 has another two network interfaces 212 and 213 through which it connects to routers 220 and 230, respectively.

In one implementation routers 220 and 230 are multicast routers that use the PIM-SM protocol in their communications with the router 210, and use IGMPv3 in their communications with devices 240, 250, 260, 270 and 280.

In one implementation devices 240, 250 and 260 are connected to a multi-access network 245, such as an Ethernet network that is also connected to a router 220 network interface. These devices send multicast traffic requests using IGMPv3 messages to the network interface 222 of the multicast router 220 through the network 245. Another device 270 is connected to another network interface 223 of router 220 through the network 275.

The device 280 is connected to the network interface 233 of the router 230 through the network 285.

In one implementation devices 240, 250, 260, 270 and 280 transmit their statuses to the control station 200 sending multicast traffic requests using the IGMPv3 protocol.

In one implementation routers 220 and 230 receive these multicast traffic requests using the IGMPv3 protocol and send them to the router 210 using the PIM-SM protocol.

In one implementation router 210 transmits the multicast traffic requests to the control station 200 using the PIM-SM protocol and in this way the control station 200 knows the status of each device from the multicast groups and channels that each device has requested to receive.

Figure 3:
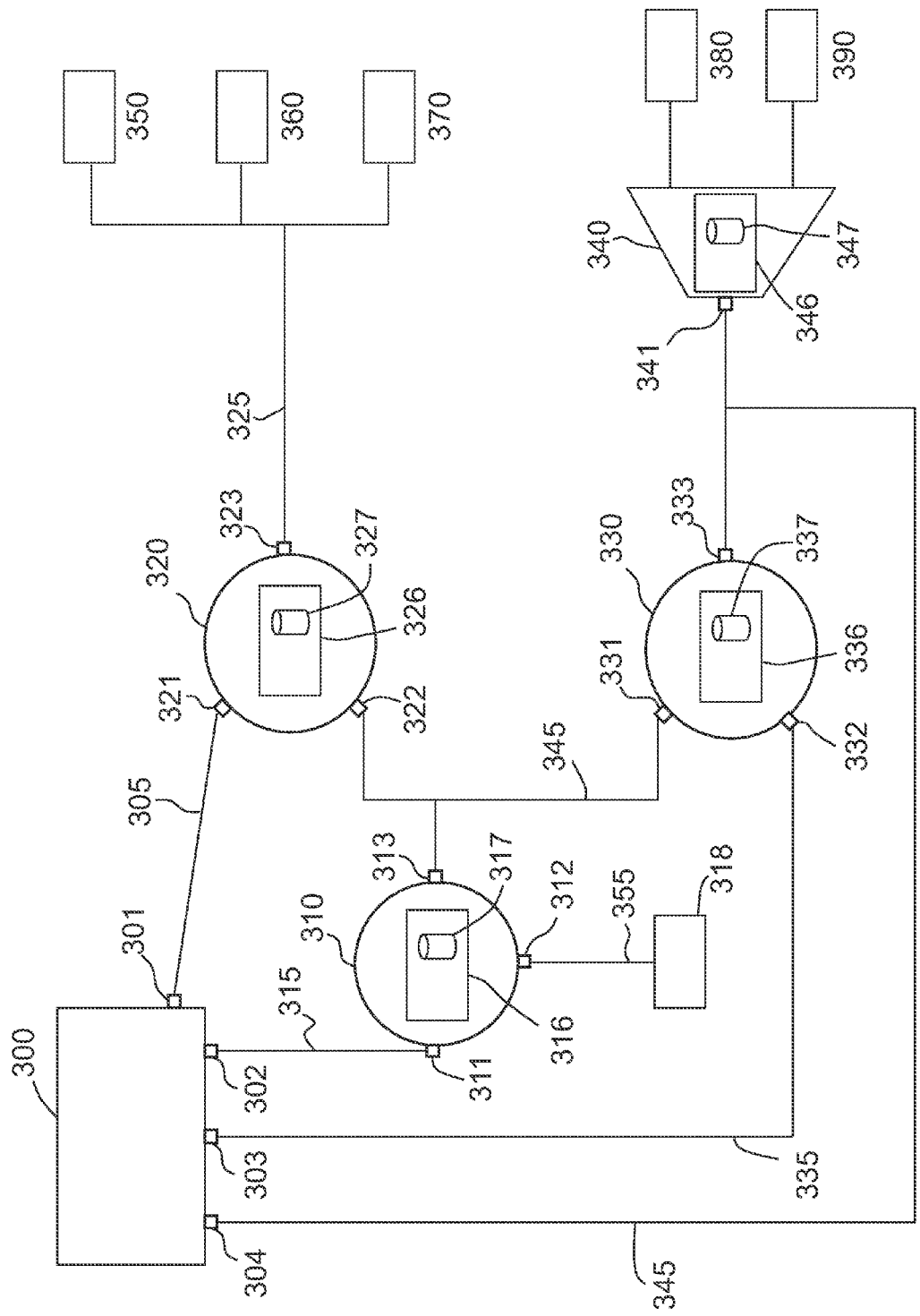
FIG. 3 illustrates an exemplary system according to implementations of the present invention.

Although the present invention can operate without the need for the SNMP protocol, this protocol is in widespread use and is the standard currently used to manage network devices. For this reason it is interesting that the present invention could be incorporated in a data network that uses the SNMP protocol, especially in the part of the network in contact with end devices such as computers, mobile telephones, PDAs or any other device that is connected to data networks. FIG. 3 illustrates such an example.

Normally, to make a new control protocol compatible with an SNMP control system a systems called "SNMP Proxies" are usually used. The function of an SNMP Proxy is to act as an intermediary between the control station that uses the SNMP management system and the new device that uses a different one or its own control protocol. To do so, the different messages and data in the new control protocol must be changed to SNMP messages and vice versa, meaning that the messages and data in the SNMP protocol must also be converted to the control system of the device.

In one implementation the present invention can also adapt its operation to an SNMP system by means of an SNMP Proxy.

However, there is another way to include this invention in a network management system that uses the SNMP protocol without the need to create an SNMP Proxy. This is achieved by using multicast router SNMP agents. Both the IGMPv3 multicast routers and the PIM-SM multicast routers from the current state of the art usually have SNMP agents.

The functioning of an SNMP agent for IGMP routers is described in the document named "Multicast Group Membership Discovery MIB" edited online by the IETF (J. Chesterfield et al., Internet Engineering Task Force, Magma Working Group, Request for Comments 4601, December 2007; currently available online at http://www.ietforg/internet-drafts/draft-ietf-magma-mgmd-mib-11.txt).

The functioning of an SNMP agent for PIM-SM routers is described in the document named "Protocol Independent Multicast MIB draft-ietf-pim-mib-v2-10.txt" edited online by the IETF (R. Sivaramu et al., Internet Engineering Task Force, PIM Working Group, September 2007, currently available online at ftp://ftp.rfc-editor.org/in-notes/internet-drafts/draft-ietf-pim-mib-v2-10.txt).

In one implementation SNMP agents are used to store information about the status of the devices, in the form of multicast groups and channels requested by each device, and to transmit this information using the SNMP protocol to the SNMP or "SNMP Manager" control station. FIG. 3 illustrates an example.

In one implementation SNMP control station 300 communicates by means of the SNMP protocol with the PIM-SM router 310 and two IGMP routers 320 and 330. The communication between the control station 300 and the PIM-SM router takes place over the network 315. Communication between the control station 300 and the two IGMP routers 320 and 330 takes place over the networks 305 and 335 respectively.

The PIM-SM router communicates with both IGMP routers 320 and 330 over a multi-access network 345, using the PIM-SM protocol.

In one implementation router 310 has an SNMP agent 316 which includes an MIB database 317 that stores the information related to the PIM-SM protocol. A multicast traffic source 318 is connected to the PIM-SM router 310 through its network interface 312 and can transmit multicast traffic to the data network.

In one implementation the two routers 320 and 330 have SNMP agents 326 and 336 respectively. In one implementation each of these SNMP agents stores information related to the IGMP protocol in its MIB database 327 and 337 respectively.

The IGMP router 330 communicates with an IGMP Proxy 340, which also has an SNMP agent 346 which stores information related to the IGMP protocol in an MIB database 347. This IGMP Proxy 340 communicates with two devices 380 and 390 that report to it their status via IGMP messages requesting to receive multicast groups and multicast channels as explained above. The IGMP Proxy 340 groups the information about the multicast groups and channels requested by the devices 380 and 390, and sends some IGMP messages to the router 330 with the information grouped as established in the RFC 4605 specifications.

The IGMP router 320 communicates with three devices 350, 360 and 370 over a multi-access network 325. These devices report their status sending IGMP messages to the router 320 in which they request multicast groups and channels.

The information about the status of devices 350, 360 and 370 can reach the SNMP control station 300 through the SNMP agent 326 of the router 320 or through the agent 316 of the router 310. This allows the establishment of a control of devices that request multicast groups and channels in a hierarchical way, enabling distributed control of the network devices. This is another advantage of the present invention which uses the multicast communication tree itself to establish this hierarchical control.

In a similar way, the status information of devices 380 and 390 can reach the SNMP control station SNMP 300 through the SNMP agent 346 of the IGMP Proxy 340, through the SNMP agent 336 of the IGMP router 330 or through the SNMP agent 316 of the PIM-SM router 310. This allows the control station 300 to control the devices 380 and 390 from any of these three network levels.

In one implementation the SNMP control station 300 includes an application that enables the status of each device to be shown from the information about the multicast groups and multicast channels requested for each device.

The example of FIG. 3 also shows a multicast data source 318 connected to the PIM-SM router 310. If any of the devices 350, 360, 370, 380 or 390 sends IGMP messages to receive multicast traffic from the source 318, the system described also allows the traffic requested by the devices to be monitored. Although only source 318 is shown connected to the PIM-SM router, it is appreciated that a plurality of sources may be connected to the router 310.

In a similar way to the explanation provided above, the control station can send multicast data IP packets to a single device using a multicast channel that has requested only that device, or to all devices using a multicast group requested by all devices. These IP data packets may contain, for example, information to configure the devices, information enabling the devices to know which router to send the IGMP messages to, or any other information that may be useful for the devices.

The operation of the system in FIG. 3 may however present many problems due to the way the IGMPv3 protocols and PIM-SM protocols are defined in the current state of the art. This can be a reason why multicast technology is not being used to control network devices.

A first problem in FIG. 3 could be the existence of a device in the network 325 that requests multicast traffic from one of the multicast groups used in the devices via EXCLUDE-type IGMP messages for a specific multicast group. In this case, according to the IGMPv3 protocol, the information about all of the multicast channels associated with multicast group requested by the devices is lost in the router 320 and the device status information does not reach the control station.

For example, if the device 350 sends an EXCLUDE ({ },G5) type message, according to the IGMPv3 protocol, the IGMP router stores only the request from the multicast group G5 and does not store any request for multicast channels that correspond to group G5, and therefore the information about the multicast channels from group G5 requested by devices 360 and 370 is lost, and this information does not reach the control station.

The device 350 that sends the EXCLUDE-type IGMP message may be a device that does not implement the present invention. What may also happen is that the device 350 has a virus or other type of software that tries to interfere with the proper operation of the devices 360 and 370.

To avoid this problem, in one implementation INCLUDE-type requests and EXCLUDE-type IGMPv3 requests are separated in the routers 320 and 330. U.S. Pat. No. 7,640,333 B1 entitled "Method and Device for Managing Multicast Groups" file the applicant on Feb. 25, 2009, describes an IGMP router that separates the INCLUDE and EXCLUDE messages and can be applied to resolve this problem. U.S. Pat. No. 7,640,333 B1 is hereby incorporated by reference. An application of one or more of the methods disclosed in U.S. Pat. No. 7,640,333 B1 to the routers 320 and 330 may be used to address the problem.

A second problem relating to IGMPv3 protocol is that the IGMP routers do not store the multicast traffic information requested by each equipment. If there are many devices that request the same multicast group, such as group G9 for example, to transmit status 9 of Table 1 for the traffic lights in the above example, or many devices that request the same multicast channel, such as the multicast channel (S1,G8), for example, to transmit the information about status 8 of Table 1, the IGMP router only stores for each interface whether or not to transmit the traffic, but does not store which devices have requested this traffic. This may happen, for example, in the devices 350, 360 and 370 in FIG. 3 which are connected to the same network interface 323 of the IGMP router 320 through a multi-access network, such as, for example, an Ethernet network.

A similar problem to the one explained for multi-access networks that connect hosts with routers or routers with routers, occurs when this equipment communicate through a switch, as a switch is a level 2 item of equipment that doesn't know which ports to send the multicast IP packets to and, by default, sends the multicast packets to all ports.

To avoid this problem, in one implementation the IGMP routers 320 and 330 store the multicast traffic information requested by each device separately.

One method of storing multicast traffic requested by each device is to do it directly in the MIB database of the SNMP agent of the IGMP router, and not to take this information into account in the operation of the IGMP router and when communicating with the devices that send it IGMP messages requesting multicast traffic.

Another method is to store the multicast traffic information requested by each device. In one implementation the information is stored using IGMP type records. This is especially beneficial in IGMP routers and has the benefit of optimizing the operation of the IGMP router, reducing the latency and eliminating unnecessary IGMP messages.

U.S. Patent Application Publication US2010/0183008A1, filed Apr. 24, 2009, and entitled "Method for Managing Multicast Traffic in a Data Network and Network Equipment Using said Method" discloses improved IGMP routers that store the information about the multicast traffic requested by each device. U.S. Patent Application Publication US2010/0183008A1 is hereby incorporated by reference. In one implementation the operation of such a router can be applied to store the multicast traffic information requested by each device. In one implementation in order for the SNMP agent to send this information, in one implementation, in addition to saving all or a portion of the information in the routing records, the IGMP router also store it in the improved MIB database of the SNMP agent of the improved router.

In this manner, according to one or more implementations, the IGMP routers 320 and 330 of FIG. 3 store the multicast traffic requested by each device and this information is stored in the MIB database of the SNMP agent of each router. The same is applicable with the IGMP Proxy 340.

A similar problem occurs with the PIM-SM protocol. In FIG. 3, the router 310 communicates with routers 320 and 330 using the PIM-SM protocol in a multi-access network 345. The PIM-SM protocol from the state of the art also does not store the information from the traffic requested by each PIM-SM router and only stores whether or not it must transmit specific traffic through a specific router network interface. In FIG. 3 this problem is shown in the multi-access network 345.

As with an IGMP protocol, a PIM-SM router can store traffic information requested by each router in different ways. One method is to do so directly in the MIB database of the SNMP agent, and another method is to store the information in the PIM-SM routing records to optimize the operation of the PIM-SM router. In the latter case, in one implementation this information is also included in the MIB database of the SNMP agent of the PIM-SM router.

U.S. patent application Ser. No. 12/756,849 filed Apr. 8, 2010, and entitled "Method for Managing Multicast Traffic between Equipment in a Multicast Data Network" discloses the operation of a PIM-SM router that stores the information from the multicast traffic information requested by each PIM-SM router. The same or similar operation may be applied to one or more implementations of the present invention.

For example, in one implementation the PIM-SM router 310 of FIG. 3 stores the multicast traffic requested by each router 320 and 330 in the multi-access network 345, and this information is also stored in the MIB database of the SNMP agent of each router.

Also, similar to the description provided above, if any of the devices 350, 360, 370, 380 or 390 sends IGMP messages to receive multicast traffic from the source 318, the present invention allows the multicast traffic requested by the devices to be monitored.

US Patent Application Publication US2010/0183008A1 discloses some of the following:

To explain the way of assembling messages in a proxy using the IGMPv3 protocol, the RFC 4605 specifications, defining the operation of the IGMP proxy, refer to section 3.2 of RFC 3376 defining the IGMPv3 protocol. The rules are the same as those to deduce the state of a network interface of a host based on several records. These rules adapted to the operation in an IGMP proxy are reproduced below:

Rule 1. For a specific network interface and multicast group, if any of the data sources of the received messages of the group is EXCLUDE, then an EXCLUDE type message is sent for the group and the source list of the message is the intersection of the EXCLUDE source lists minus the sources of the INCLUDE messages.

Rule 2. For a specific network interface and multicast group, if all the data sources of the received messages of the group are of the INCLUDE type, then an INCLUDE type message is sent for the group and the source list of the network interface is the union of all the INCLUDE sources.

Therefore, the method applied by an IGMP proxy consists of assembling the sources of the different messages of each multicast group received in each proxy network interface without taking into account which host sends the message: the proxy stores in which network interface the IGMP message has been received, but it does not store the identification of the host that has requested each source.

The same occurs in an IGMP router, the operation of which is explained in section 6 of RFC 3376. For each network interface of the IGMP router and for each multicast group, the IGMP router stores the information of the channels and multicast groups requested but it does not store the identification of the host requesting each channel or each multicast group.

The IGMP routers periodically send to the hosts messages referred to as Membership Query messages so that the hosts reply informing about the groups and sources from which they wish to receive multicast traffic. The hosts can also send messages to the router to request multicast traffic without waiting for the router to send a Membership Query message.

The routers execute the IGMP protocol in all the networks they are directly connected to. If an IGMP router has more than one network interface connected to the same network it only needs to execute the protocol in one of said network interfaces.

For each network card or network interface, and for each multicast group, the IGMP routers store the information of the INCLUDE and EXCLUDE multicast sources in one record:

Record: (multicast-address, group-timer, filter-mode, {(source-address, source-timer)})

Wherein
multicast-address is the multicast group;
{(Source-address, source-timer)} is a list of elements (source-address, source-timer), source-address being the source IP address and source-timer being a timer associated to said source;
filter-mode can be INCLUDE or EXCLUDE and it has the same operation as that described in RFC 3376: to indicate if the sources of the source list and timers are INCLUDE sources or EXCLUDE sources;
group-timer is a timer used as a mechanism for the transition of the filter-mode of a state record of the router from EXCLUDE mode to INCLUDE mode. When the group-timer of a specific multicast group and network interface reaches zero, the router assumes that there are no longer hosts with EXCLUDE filter-mode connected to said network interface and it switches to the INCLUDE mode.

The value of the decreases with time and when the router receives a Membership Report message from a host the router reinitiates the corresponding timers.

If the record has an INCLUDE filter-mode, the timers operate in the following manner: for a specific network interface, a specific multicast group and a specific included source-address, as long as the source-timer is greater than zero the router will continue transmitting through said network interface the multicast traffic from the channel (source, multicast group); when the source-timer reaches zero, the router will stop transmitting said traffic and will eliminate the source from the INCLUDE source list of that multicast group.

If the record has a EXCLUDE filter-mode the timers operate in a similar manner, but with the difference that the EXCLUDE sources are classified in two lists: a first list referred to as Requested List containing the sources the source-timer of which has a value greater than zero and a second list referred to as Exclude List containing the sources the source-timer of which has a value zero.

If a record has an EXCLUDE filter-mode for a specific multicast group, the router transmits all the traffic from all the sources of said multicast group except the EXCLUDE sources of the Exclude List.

The router also uses the timers to make sure that, after having sent a Group Specific Query message or a Group and Source Specific Query message, all the hosts have had enough time to reply to said message.

There are several reasons for the existence of a Requested List in IGMPv3. One of them is that in a network with several hosts sending messages to an IGMP router, it is possible that there could be a conflict between the requests of the different hosts. This occurs, for example, when a host requests traffic from a specific source and another host requests traffic excluding said source. For example, a host H1 sends a first EXCLUDE({S1},G1) message and another host H2 in the same Ethernet network then sends a second EXCLUDE({S1,S2,S3},G1) message to the same router. Upon receiving the second message, if the router places the sources {S1,S2,S3} of the second message in the Exclude List, the host H1 would stop receiving traffic from sources S2 and S3 that it wanted to receive because it wanted to receive all the traffic except the traffic from source S1. To avoid this problem, the IGMP router places in the Exclude List only the intersection of the set of sources of the new message with the set of sources that there were in the Exclude List before receiving said message. The remaining EXCLUDE sources go to the Requested List and, optionally, the router sends a Group-And-Source-Specific Query message to the hosts to ask if there is any host that is still interested in receiving traffic from sources S2 and S3 of group G1.

Table 2 (at the end of this document), extracted from the RFC 3376, summarizes the operation of a router according to the IGMPv3 protocol.

In Table 2, the first column "State 1" shows the initial state of the record of the IGMP router; the second column "Message" shows the content of a Membership Report message received by the IGMP router; the third column "State 2" shows the state of said record of the IGMP router after having received the Membership Report message; the fourth and last column "Actions" shows the actions that the IGMP router carries out after having received said Membership Report message. Table 2 contains 12 rows respectively corresponding to 12 examples which each illustrates the operation of the router according to its initial state (column 1) and according to the messages it has received (column 2). Each row of Table 2 is separated from another row by a dotted line.

Table 2 relates to a specific network interface of the IGMP router executing the IGMPv3 protocol and a specific multicast group G. Each network interface and multicast group G will have their own state records which will be affected by the messages that the IGMP router receives through said network interface referring to said group G.

The following nomenclature has been used in Table 2:
(A+B) means the union of the sets of sources A and B.
(A*B) means the intersection of the sets of sources A and B.
(A−B) means the set of sources A minus the sources of A that are also found in B.
INCLUDE (A) indicates that the IGMP router has a record with INCLUDE filter-mode with a set of sources A.
EXCLUDE (X,Y) indicates that the IGMP router has a record with EXCLUDE filter-mode because there are EXCLUDE sources, wherein:
i) X is the Requested List of EXCLUDE sources
ii) Y is the Exclude List of EXCLUDE sources.
GMI is a parameter referred to as Group Membership Interval containing a value of time. A value of 260 seconds is used by default.
T (S) is the source timer of source S.
GT is the Group Timer, i.e. the timer of the record for switching from EXCLUDE mode to INCLUDE mode.
SEND Q(G, S) means that the IGMP router sends a Group-And-Source-Specific Query message to the hosts to check if there is still a host interested in receiving the sendings from sources S of multicast group G. When this action is carried out, the IGMP router also reduces the timers of the sources S to the LMQT value. If the IGMP router receives in response a message showing interest in any of the sources S, it then initializes the value of the timers of said sources, for which there is an interested host, to an initial value equal to GMI.
DEL(A) means that the IGMP router deletes from the record the sources of list A.
LMQT is a parameter referred to as Last Member Query Time containing a time value. It is the time a host has to reply to a Group-And-Source-Specific Query type message which has been sent by the IGMP routers. After this time, if no host replies that it is interested in receiving the channels specified in said message, the IGMP router stops transmitting them. The value of LMQT in the IGMPv3 protocol is 20 seconds by default.

The messages in column 2 of Table 2 are the six types of IGMP messages defined in the IGMPv3 protocol for indicating to the router the sources from which it wishes to obtain multicast traffic. The meaning of these six IGMP messages is described in RFC 3376 (chapter 4.2.12) and is as follows:

IS_IN (Z), IS_EX (Z) indicate that the network interface of the host that has sent the message has an INCLUDE or EXCLUDE filter-mode, respectively, for the sources of list Z.

TO_IN (Z), TO_EX (Z) indicate that the network interface of the host that has sent the message has switched the filter-mode from EXCLUDE mode to INCLUDE mode, or from INCLUDE mode to EXCLUDE mode, respectively, for the sources of list Z.

ALLOW (Z) indicates that the network interface of the host that has sent the message wishes to receive the traffic from the new sources of list Z. These sources are the sources that said network interface will add to its INCLUDE source list or they are the sources that it will delete from its EXCLUDE source list.

BLOCK (Z) indicates that the network interface of the host that has sent the message no longer wishes to receive traffic from the sources of list Z. These sources are the sources that said network interface will delete from its INCLUDE source list or they are the sources that it will add to its EXCLUDE source list.

It can be seen that the 12 rows of Table 2 correspond to the 12 possible combinations of an initial state record of the router (column 1) and of a type of IGMP message received (column 2).

The router always consults the hosts by means of a Group-And-Source-Specific Query message (SEND messages in column 4 of Table 2) for checking if there is any host interested in receiving those sources the traffic of which was being initially transmitted (column 1 of Table 2) and no longer wishes to receive according to the sources indicated in the last received IGMPv3 message (column 2 of Table 2). This operation is inefficient because unnecessary Group-And-Source-Specific Query type messages are sent, and furthermore traffic is transmitted from sources that no host wishes to receive. Managing these situations in the twelve cases of Table 2 further involves enormous technical complexity.

It is also common for users of a multicast system, who act through the hosts, to have a behavior known as zapping, which consists of quickly and successively changing channels. When a host requests a new channel, the IGMP router initiates the transmission of said channel but it does not stop it when the host changes the channel again, but rather the router sends a Group-And-Source-Specific Query message and maintains the transmission during the LMQT time. If this occurs repeatedly in a short time frame, the IGMP router has to manage all these messages and it will further be uselessly sending the entire series of channels through which the user has passed by zapping.

Table 3 (at the end of this document) shows a specific example illustrating these inefficiencies. The example of Table 3 relates to the case of a host which changes channels within a multicast group G. Column 1 of the table shows the successive IGMP messages sent by the host, column 2 shows the source list the traffic of which the router sends after having received said IGMP message, and column 3 shows the actions performed by the router after having received said IGMP message. The two messages SEND Q(G, S1) and SEND Q(G, S2) (Group-And-Source-Specific Query messages sent by the router) in column 3 of Table 3 are unnecessary because the host no longer wishes to receive the traffic sent by sources S1 and S2 indicated respectively in said messages. It is also unnecessary for the router to transmit channels (S1, G) and (S2, G) during the LMQT time.

The management of unnecessary messages by the router involves considerable consumption of calculation capacity that could be avoided. Furthermore, unwanted traffic transmission unnecessarily consumes bandwidth. These inefficiencies are multiplied in the router when there are thousands of hosts changing channels.

The operation of the network equipment applying the IGMP protocol according to the one implementation is similar to that of the network equipment of the state of the art applying the IGMPv3 and MLDv2 protocols. To that end, to aid in understanding, the same nomenclature has been used below as what is used in the RFC 3376 (IGMPv3 protocol) and RFC 3810 (MLDv2 protocol) specifications mentioned above.

Furthermore, since the operation of the IGMP protocol according to the invention is similar to the operation of the IGMPv3 protocol, all the features that are common to IGMPv3 are not explained.

A feature of the invention is that the network equipment receiving IGMPv3 messages by means of which the hosts request multicast traffic, such as an IGMPv3 router, a switch and an IGMPv3 proxy, store in a table the separate information of the sources which each host sending IGMPv3 messages requests, requesting multicast traffic along with a unique identifier of the host that has sent each message.

To that end, this network equipment maintains a state record for each network interface, multicast group and host sending the message, thereby knowing which multicast traffic sources are requested by each host independently.

Upon storing the information separately, identifying the requests of each host, there are no longer conflicts between the sources requested in the messages from different hosts, because when a host sends a message to stop receiving a specific channel (S,G) to a network interface of an IGMP router, said router knows exactly if there is another host connected a that same network interface and interested in receiving that same channel (S,G). If there is another interested host, the IGMP router continues transmitting the channel (S,G), but if there is no other interested host, it stops sending the channel (S,G) in the very moment it receives the message asking it to stop transmitting it, without needing to send a Group-And-Source-Specific Query message and waiting for the reply.

As indicated in RFC 3376, at the beginning of section 4, the IGMP messages are encapsulated in IPv4 datagrams, with protocol number 2. An IPv4 datagram contains a field indicating the IP address of the equipment sending said datagram.

A particularly effective way of implementing the present invention consists of using, as an identifier of the equipment sending each IGMP message, the IP address of said equipment. It is possible that some equipment sending IGMP messages does not have its own IP. This occurs, for example, in some types of DSLAM sending the IGMP messages using IP 0.0.0.0. In these cases, it is possible to assign an IP address to the DSLAM and the latter will use it in its IGMP messages.

The MAC (Media Access Control) address of the data frame encapsulating the IP data packet carrying the IGMP message sent by the host can also be used as an identifier of said host. The use of this identifier is particularly useful in switches implementing the present invention since switches are level 2 equipment knowing in which port each equipment is connected, identifying it by its MAC address and not by its IP address.

The operation of the IGMP protocol according to the invention in each network equipment: the improved IGMP router, the improved IGMP proxy and an improved switch performing the IGMP snooping function, is described in detail below.

A difference with regard to IGMP routers of the state of the art applying the IGMPv3 and MLDv2 protocols is that the improved IGMP router according to the invention has a state record for each network interface, multicast group and host of origin, in which it stores the sources requested by each host:

Record: (interface, multicast-address, hostID, group-timer, filter-mode {(source-address, source-timer)})

Wherein interface indicates the network interface of the router through which the IGMP router has received the IGMP message;

multicast-address is the multicast group;

hostID is an identifier of the host that has sent the IGMP message;

{(source-address, source-timer)} is a list of elements (source-address, source-timer), where source-address is the source IP address and where source-timer is a timer associated to said source;

filter-mode can be INCLUDE or EXCLUDE and has the same operation as that described in RFC 3376: to indicate if the sources of the source list and timers are INCLUDE sources or EXCLUDE sources.

In the state records having an EXCLUDE filter-mode the EXCLUDE sources are classified in two lists: a first list referred to as Requested List containing the sources the source-timer of which has a value greater than zero and a second list referred to as Exclude List containing the sources the source-timer of which has value zero.

The principle for classifying the EXCLUDE sources into two lists, Requested List and Exclude List, according to the value of the source-timer is similar to the one applied in the IGMPv3 and MLDv2 protocols. The RFC 3810 specifications (MLDv2 protocol) mentioned above contain an explanation of this principle.

Each message that the IGMP router receives through a specific network interface, from a specific host and referring to a specific multicast group, affects only the state record of said network interface, host and multicast group.

As a result of the improved IGMP router identifies the origin of each IGMP message, it can behave in a deterministic manner for each host, i.e. the messages from each host determine the state of the router records associated with said host and it is not necessary to consult other hosts or take other hosts into account.

This deterministic behavior of the IGMP router is shown in Table 4 (at the end of this document), which is similar to Table 2 but for an improved IGMP router according to the invention.

Table 2 relates to a specific network interface of the router and multicast group, whereas Table 4 relates to a specific network interface of the router, a specific multicast group and a specific host sending IGMP messages.

Both tables show the same combinations of initial states (column 1) and received IGMP messages (column 2), but as can be seen, the final states (column 3) and the actions of the IGMP router (column 4) are different. It can particularly be seen that in Table 4, column 4 (actions performed by the IGMP router) contains no SEND Q(G,S) message, since the improved IGMP router according to the invention does not need to send Group-And-Source-Specific Query messages to check if there is any host interested in receiving channel (S,G).

When the improved IGMP router has to decide if it must transmit a specific channel through a specific network interface, the algorithm of said router takes into account the different state records of the host referring to said multicast group and said network interface.

For a specific network interface, a specific multicast group G, and a specific INCLUDE source S, as long as there is a state record of a host referring to said network interface and said multicast group G the filter-mode of which is INCLUDE and the source-timer of which associated to said INCLUDE source S is greater than zero, the improved IGMP router will transmit through said network interface the multicast traffic of channel (S,G). Furthermore, if for said network interface and multicast group G there are state records the filter-mode of which is EXCLUDE, the improved IGMP router will further transmit through said network interface the multicast traffic from all the sources except the sources of the set resulting from the intersection of all the Exclude Lists of said state records with EXCLUDE filter-mode for said network interface and multicast group G.

When the timer associated to a specific INCLUDE source S of a state record with INCLUDE filter-mode reaches zero, said source S is eliminated from the INCLUDE source list of said state record.

When a state record with INCLUDE filter-mode does not contain any source in its INCLUDE list, said state record is eliminated.

The Requested List is used in the improved IGMP router for switching a state record from EXCLUDE filter-mode to INCLUDE filter-mode, as explained in section 3 of Appendix A of RFC 3376.

Another advantage of maintaining the Requested List is that it allows effectively managing the situation occurring when the improved IGMP router has a record with an EXCLUDE filter-mode for a specific network interface of said router, a specific multicast group and a specific host, and said router receives from that same host a second message indicating to it that it wishes to receive traffic from a specific source S1, for example an ALLOW (S1) message. In this case if the router eliminates the source S1 from the Exclude List, and if the Requested List did not exist, said router would lose the IP address information for source S1 and would have to use ASM-type routing algorithms to receive the traffic from source S1. Upon maintaining the information of S1 in the Requested List, said information is not lost and can be used by the router to directly access source S1

The implementation method of the invention described below implements a modification to the IGMP protocol that enables a router or an IGMP proxy not to have to combine the traffic requests it receives referring to the same multicast group into one INCLUDE or EXCLUDE IGMP message, as is currently required by the IGMPv3 protocol, but instead it can combine them into one INCLUDE-type message and one EXCLUDE-type message, and send both messages.

For IGMP routers and IGMP proxies to be able to function in this manner, i.e. separately assembling the INCLUDE messages and the EXCLUDE messages and sending independent PIM-SM messages for each multicast group and filter-mode of the IGMP protocol, additional modifications to the IGMP protocol besides those explained in the first embodiment have been developed.

The modified IGMP protocol according to the invention differs from the previously explained protocol in that, in addition to performing an individual follow-up on the sources that each host of origin sending each message requests, the network interfaces can operate in dual mode: they can separately store and transmit the information of the sources contained in the IGMP INCLUDE type messages and the information of the sources contained in the IGMP EXCLUDE type messages.

To that end, the modified IGMP protocol saves two records: one for the EXCLUDE filter-mode and another one for the INCLUDE filter-mode for each network interface and multicast group. Therefore, an IGMP proxy or router using the modified IGMP protocol can save, for each network interface and multicast group, two separate records:

INCLUDE Record: (interface, multicast-address, hostID, group-timer, filter-mode=INCLUDE, {(source-address, source-timer)})

EXCLUDE Record: (interface, multicast-address, hostID, group-timer, filter-mode=EXCLUDE, {(source-address, source-timer)})

Wherein
- interface indicates the network interface of the router through which the IGMP router has received the IGMP message;
- multicast-address is the multicast group;
- hostID is an identifier of the host that has sent the IGMP message.
- {(source-address, source-timer)} is a list of elements (source-address, source-timer), where source-address is the source IP address and where source-timer is a timer associated with said source;
- filter-mode can be INCLUDE or EXCLUDE and has the same operation as that described in RFC 3376: to indicate if the sources of the source list and timers are INCLUDE sources or EXCLUDE sources.

When the improved IGMP router or proxy has to decide if it must transmit a specific channel through a specific network interface, the algorithm of said router or proxy takes into account the different state records of the host referring to said multicast group and said network interface, but with the different that now the hosts can have two state records with different INCLUDE and EXCLUDE filter-mode for a single multicast group. The algorithm applies the following rules:

For a specific network interface, a specific multicast group G, and a specific INCLUDE source S, as long as there is a state record of a host referring to said network interface and said multicast group G the filter-mode of which is INCLUDE and the source-timer of which associated with said INCLUDE source S is greater than zero, the improved IGMP router will transmit through said network interface the multicast traffic of channel (S,G).

Furthermore, if for said network interface and multicast group G there are state records the filter-mode of which is EXCLUDE, the improved IGMP router will further transmit through said network interface the multicast traffic from all the sources except those of the set resulting from the intersection of all the Exclude Lists of said state records with EXCLUDE filter-mode for said network interface and multicast group G.

Table 5 (at the end of this document) shows the operation of an improved router applying the IGMP protocol modified according to the invention. In its initial state, the router has, for a specific network interface, a specific multicast group G and a specific host two state records for said multicast group G because it has INCLUDE sources as well as EXCLUDE sources.

As in Table 4, Table 5 relates to a specific network interface of the router, a specific multicast group and a specific host sending IGMP messages.

As can be seen in Table 5, the use of two separate records for storing the INCLUDE and EXCLUDE sources together with the individual follow-up of the traffic requests of each host allows eliminating the Requested-List which is no longer necessary. The EXCLUDE(Y) lists represent the Exclude List, and the EXCLUDE sources no longer need timers, simplifying their operation.

The Group-Timer or GT continues to be used to eliminate the EXCLUDE record when said timer reaches zero.

It can also be seen in Table 5 that four new IGMP messages have been defined. The first two ALLOWIN (B) and BLOCKIN (B) modify the sources of the INCLUDE record and the last two ALLOWEX (B) and BLOCKEX (B) modify the sources of the EXCLUDE record.

In the same manner, the IS_IN(B) message only affects the INCLUDE record and the IS_EX(B) message only affects the EXCLUDE record. This separation of messages affecting the INCLUDE and EXCLUDE records provides enormous simplicity. When comparing Table 5 with Table 2, it is obvious that Table 5 is much simpler than Table 2. In addition to having simplified the management of timers and having eliminated the sending of Group-And-Source-Specific Query messages, it has been achieved that the IGMP router only has to manage the six cases corresponding to the six rows of Table 5, instead of the twelve cases appearing in Table 2. The comparison between Tables 2 and 5 shows that the improved IGMP protocol considerably aids in implementing and programming the algorithms in the routers, as well as solving the aforementioned inefficiency problems.

For communications between a host and an IGMP router, the modified IGMP protocol uses the same messages as the IGMPv3 protocol, which are described in section 4 of RFC 3376. The only difference is in the internal format of the data blocks referred to as Group Record which are contained in each Membership Report message: in the modified IGMP protocol, when there are INCLUDE sources and also EXCLUDE sources for the same multicast group, two Group Records are included in the Membership Report message: one for INCLUDE sources and another one for EXCLUDE sources.

U.S. patent application Ser. No. 12/756,849 discloses some of the following:

Following the nomenclature used in the SSM technology, the broadcasting of the S source from the G multicast group is termed channel (S,G), where S is an IP address that identifies the source that broadcasts the data, and G is an IP address within the range reserved for multicast groups, which is identified by the multicast group.

Hereinafter the expressions upstream and downstream will likewise be used to indicate relative locations from network equipment: the expression upstream relates to a location in the direction towards the multicast source and the expression downstream relates to a location in the opposite direction.

In the first multicast routing protocols, such as the DVMRP protocol (Distance Vector Multicast Routing Protocol) for example, the routers exchanged between one another messages called "DVMRP Route Reports" with information to build the multicast topology database. The multicast topology database is where the routers store the information from all the multicast routers existing in the network and how they are connected to one another. In the DVMRP protocol, each router sent these messages every 60 seconds.

The PIM-SM protocol works in a different manner. The PIM-SM routers do not send messages to create the multicast topology database, but rather they use the unicast database of the router to deduce from it the multicast topology database and they do so independently of the unicast protocol that the router uses. This is the reason for the name Protocol Independent Multicast. PIM-SM therefore does not depend on any specific unicast protocol and can create the multicast topology database in the routers independently of the unicast protocol that each router uses.

In the PIM-SM protocol the multicast topology database is stored in a table called MRIB (Multicast Routing Information Base) which is used, among other purposes, for deciding which router the JOIN/PRUNE messages should be sent to. These JOIN/PRUNE messages of the PIM-SM protocol, which are well-known by the person skilled in the art, are the messages sent by one PIM-SM router to another PIM-SM router to indicate that it wishes to receive multicast traffic (JOIN messages) or that it wishes to stop receiving multicast traffic (PRUNE messages). The multicast data are transmitted towards the router that has requested multicast traffic following the same way as the JOIN messages, but in the opposite direction.

A first drawback of the PIM-SM protocol is the delay in transmitting the PRUNE-type messages that one PIM-SM router sends to another PIM-SM router to indicate that it no longer wishes to keep receiving a specific multicast traffic. When a PIM-SM router receives a PRUNE-type message, for example PRUNE (S,G), it does not immediately stop transmitting the traffic from the multicast channel (S,G), but rather it waits for a specific time before it stops transmitting the multicast channel (S,G) through its network interface where it has received the PRUNE-type message. In the PIM-SM protocol default configuration, this wait time is 3 seconds. The reason for this wait time is that there may be other PIM-SM routers sharing a multi-access network and it is possible that there is another PIM-SM router that wishes to keep receiving the multicast channel (S,G), therefore said router must send a JOIN(S,G) message immediately in order to cancel the effect of the previous PRUNE(S,G) message.

If the number of routers is high and there are thousands of users switching multicast channels, the consequence is that there is a huge amount of bandwidth occupied in the network due to the latency or delay in suppressing the transmission of unwanted multicast channels. The problem is considerably aggravated if the multicast channels (S,G) furthermore transmit video or IPTV channels requiring a bandwidth of between 4 Mbits/s in normal resolution and 20 Mbits/s in high resolution.

Section 4.3.3. of RFC 4601, "Reducing PRUNE Propagation Delay on LANs", proposes a solution to the latency problem that consists of using the Hello messages that the PIM-SM routers use to exchange information with one another and to negotiate several parameters. Hello messages are used, for example, to negotiate whether or not there is a suppression of PIM-SM messages, the delay time in the PRUNE messages and other parameters. The PIM-SM routers send these Hello messages periodically through each network interface of the router in which the PIM-SM protocol is being executed, to a multicast address called "ALL-PIM-ROUTERS". As a result of these Hello messages, each PIM-SM router knows the existence of other PIM-SM routers connected in each of its network interfaces. All the routers also store the configuration information for the other routers which has been exchanged by means of Hello messages.

However, the Hello messages used in the PIM-SM protocol do not transmit information on the topology of multicast routers. The PIM-SM router deduces this information based on unicast routing tables.

As previously stated, when a PIM-SM router receives a PRUNE(S,G)-type message it waits for a certain time to see if there is another router sending a JOIN(S,G) message canceling the first PRUNE message. The wait time is the sum of two variables called Effective_propagation_Delay and Effective_Override_Interval, which by default take the values of 0.5 seconds and 2.5 seconds, respectively. The reason for using this sum of two variables as a delay is the following: if there is a router R1 that is receiving traffic of the multicast channel (S,G) from a router R2, and router R1 sees that another router R3 sends a PRUNE(S,G) message, router R1 must send a JOIN(S,G)-type message to router R2 to cancel the effect of the PRUNE(S,G) message before the Effective_Override_Interval time. Since the Effective_Override_Interval is always less than the sum of Effective_Override_Interval and Effective_propagation_Delay, the JOIN(S,G) message of router R1 will reach router R2 before router R2 stops sending traffic of the multicast channel (S,G).

The solution proposed in RFC 4601 for reducing the latency time consists of the fact that PIM-SM routers use the Hello messages to reduce the values of the Effective_propagation_Delay and Effective_Override_Interval variables. To that end, all PIM-SM routers announce their own Propagation_Delay and Override_Interval parameters in the Hello messages. These parameters are contained in the Hello messages in a data block called LAN_PRUNE_Delay. When all the routers executing the PIM-SM protocol in a network have sent Hello messages including the LAN_PRUNE_Delay data block, all the routers connected to one and the same multi-access network use as Effective_propagation_Delay and Effective_Override_Interval values the maximum values of the Propagation_Delay and Override_Interval parameters, respectively, that have been announced by said routers in the Hello messages.

However, this mechanism has several limitations.

In the first place, the RFC 4601 indicate that if the Effective_propagation_Delay and Effective_Override_Interval variables take very low values, it is possible that, in following with the previous example, router R2 suppresses the traffic of channel (S,G) before router R1 has time to send its JOIN message or before router R2 has time to process said message. To prevent this problem, RFC 4601 recommend not lowering the values of these variables too much. This is a serious limitation of this latency reduction mechanism.

Furthermore, another limitation or problem that this latency reduction mechanism has is that it is necessary for all the routers executing the PIM-SM protocol in a network to send messages including the LAN_PRUNE_Delay data block. If there is a router that does not include this data block in its Hello messages, this latency reduction mechanism can no longer be used and the Effective_propagation_Delay and Effective_Override_Interval variables take their default values, which are 2.5 seconds and 0.5 seconds respectively, in all the routers of the multi-access network, therefore causing a latency of 3 seconds in each router.

In addition, at the end of the mentioned section 4.3.3 of RFC 4601 relating to latency reduction, it is explained that it is possible for an Upstream PIM-SM router to have individual control or tracking of the multicast traffic requests of several downstream routers. Though it does not explain how to implement said individual tracking or what utility it has, it does indicate that to do so it is essential for all the routers of the same multi-access network to first agree to cancel the message suppression. The mentioned section 4.3.3 of RFC 4601 even includes the code that can be used to check that all the routers have agreed to cancel the message suppression.

A second problem affecting the PIM-SM protocol is the complexity of the JOIN message suppression mechanism. Basically, JOIN message suppression consists of if a downstream router R1 sees that another downstream router R2 sends a JOIN message requesting the same multicast traffic that it was going to request, said router R1 can suppress its own JOIN message, since it is sufficient that the upstream router receives a single request to transmit the requested multicast traffic.

In the latest version of the IGMP protocol multicast (IGMPv3 version), by means of which hosts request multicast traffic from a router, the message suppression, which existed in the previous IGMP versions, has been canceled. In contrast, in the PIM-SM protocol, by means of which a router requests multicast traffic from another router, message suppression still exists. In fact, message suppression is the default configuration to be applied according to RFC 4601. There is a configuration option available so that message suppression is not carried out, but it is applied only in specific circumstances and requires a complex implementation.

The message suppression mechanism that is applied in the PIM-SM protocol, according to RFC 4601, is very complicated. The message suppression cancellation mechanism is also very complicated according to RFC 4601. Therefore any modification of the PIM-SM protocol relating to message suppression is very complicated. This probably explains the lack of investigation for improvements in the PIM-SM protocol relating to message suppression. Additionally, the end of mentioned section 4.3.3 of RFC 4601 indicates that in order to perform individual tracking of the multicast traffic requested by each downstream router, it is necessary to cancel the message suppression. According to RFC 4601, if there are routers suppressing messages it is not possible to perform individual tracking of the multicast traffic requested by each router.

The following description illustrates the complexity of the message suppression mechanism and the conditions for canceling said message suppression, according to RFC 4601.

To explain the message suppression mechanism a person skilled in the art has to analyze and understand in detail the state machine called upstream (S,G), by means of which RFC 4601 specify the operation of the upstream sending of JOIN (S,G)-type messages. This state machine is shown in table form in section 4.5.7 "Sending (S,G) Join/Prune messages" of RFC 4601.

Each upstream state machine (S,G) is independent for each network interface of the router and for each multicast channel (S,G) and has only two states: the Not_Joined state, which means that the router does not need to receive the multicast channel (S,G) through said network interface, and the Joined state, which means that the router needs to receive the multicast channel (S,G) through said network interface.

If the state machine is in the Not_Joined state, and therefore the router is not receiving the multicast channel (S,G), and a "JoinDesired(S,G)->true" event occurs, indicating that the router has received a request for traffic of channel (S,G) from another downstream router, the state machine of the router executes the following actions: switching the state to Joined, sending a JOIN(S,G) message to another upstream router appearing in its MRIB table as suitable for sending it traffic of channel (S,G), and initializing a timer called Join_Timer at an initial value called t_periodic.

In the Joined state, when the "Timer_Expires" event occurs, indicating that the Join_Timer has reached zero, the router sends (Send Join(S,G)) a new JOIN(S,G) message and reinitializes the Join_Timer at the t_periodic value.

Therefore, in the Joined state the router periodically sends the JOIN(S,G) messages again to keep receiving traffic of the multicast channel (S,G).

When the "See Join(S,G) to RPF'(S,G)" event occurs, indicating that router has seen in the multi-access network it is connected to that another router has sent a message similar to the JOIN(S,G) message that it has to send when the Join_Timer reaches zero, the router increases the Join_Timer value to delay the sending of its own JOIN(S,G) message. This is explained in greater detail on page 74 of RFC 4601, indicating that if the Join_Timer has a value that is less than a variable called t_joinsuppress, then said Join_Timer is initialized with the value of this t_joinsuppress variable. However, if the Join_Timer has a value that is greater than the t_joinsuppress variable, then the Join_Timer is not modified.

Therefore, the message suppression mechanism of the PIM-SM protocol consists of increasing the value of the Join_Timer controlling the periodic sending of JOIN(S,G) messages. Since the Join_Timer is increased up to the t_joinsuppress value every time the router sees a JOIN(S,G) message of another router in the multi-access network, the Join_Timer is periodically reinitialized at the t_joinsuppress value and never reaches zero. This is what makes the router not send its own JOIN(S,G) message, i.e. it suppresses its own periodic JOIN(S,G) message as long as there is another router in the same multi-access network that is sending an equivalent JOIN(S,G) message.

Message suppression in the PIM-SM protocol has been explained up to this point. Explained below is how the mechanism canceling said message suppression works.

The mechanism to cancel message suppression in the PIM-SM protocol, as deduced from RFC 4601, consists of making the value of the t_joinsuppress variable zero. When the router sees a JOIN(S,G) message it checks to see if the Join_Timer is less than the t_joinsuppress variable, which is equal to zero, which obviously never occurs, and said Join_Timer is left unmodified. The router thus sends its own JOIN(S,G) message when its Join_Timer, which is not modified by the messages of the other routers, reaches zero.

The t_joinsuppress variable takes the lowest value between the value of another variable called t_suppressed and a parameter called holdtime which is transmitted in the JOIN (S,G) messages and indicates for how much time the router that has sent the JOIN(S,G) message wishes to be receiving the channel (S,G). The t_suppressed variable takes a different value depending on whether or not message suppression is enabled. There is a function called Suppression_Enabled(I) which is specific for each network interface I and returns the value TRUE if message suppression is enabled, and the value FALSE if message suppression is cancelled:

If the Supression_Enabled(I) function returns a TRUE value, then the t_suppressed variable takes a random value within the range [1,1*t_periodic; 1,4*t_periodic], where t_periodic is a variable taking the value of 60 seconds by default.

If the Supression_Enabled(I) function returns the FALSE value, the t_suppressed variable is zero, and the t_joinsuppress variable is also zero, taking the lowest value between t_suppressed and the holdtime parameter. Modifying the Join_Timer when the Supression_Enabled(I) function returns a FALSE value is thus prevented and each router thus sends its periodic JOIN(S,G) messages without taking into account the JOIN(S,G) messages the other routers send, whereby canceling message suppression.

This message suppression cancellation mechanism defined in RFC 4601 is unnecessarily complicated. It is also inefficient because if the Supression_Enabled(I) function returns a FALSE value, before having made the decision of whether or not to modify the Join_Timer, the router will have checked two times to see if a positive quantity is less tan zero, something which cannot happen.

Since the PIM-SM protocol is a complex protocol, programmers designing applications implementing said protocol follow RFC 4601 specifications in the most exact manner possible to prevent finding new design problems that are not provided for in said specifications. As a result, applications implementing the PIM-SM protocol have the previously explained limitations. These limitations, along with the complexity involved with message suppression in the PIM-SM protocol, are the reasons that no satisfactory solution to the latency problem in the PIM-SM protocol has been developed up until now.

Figure 4:
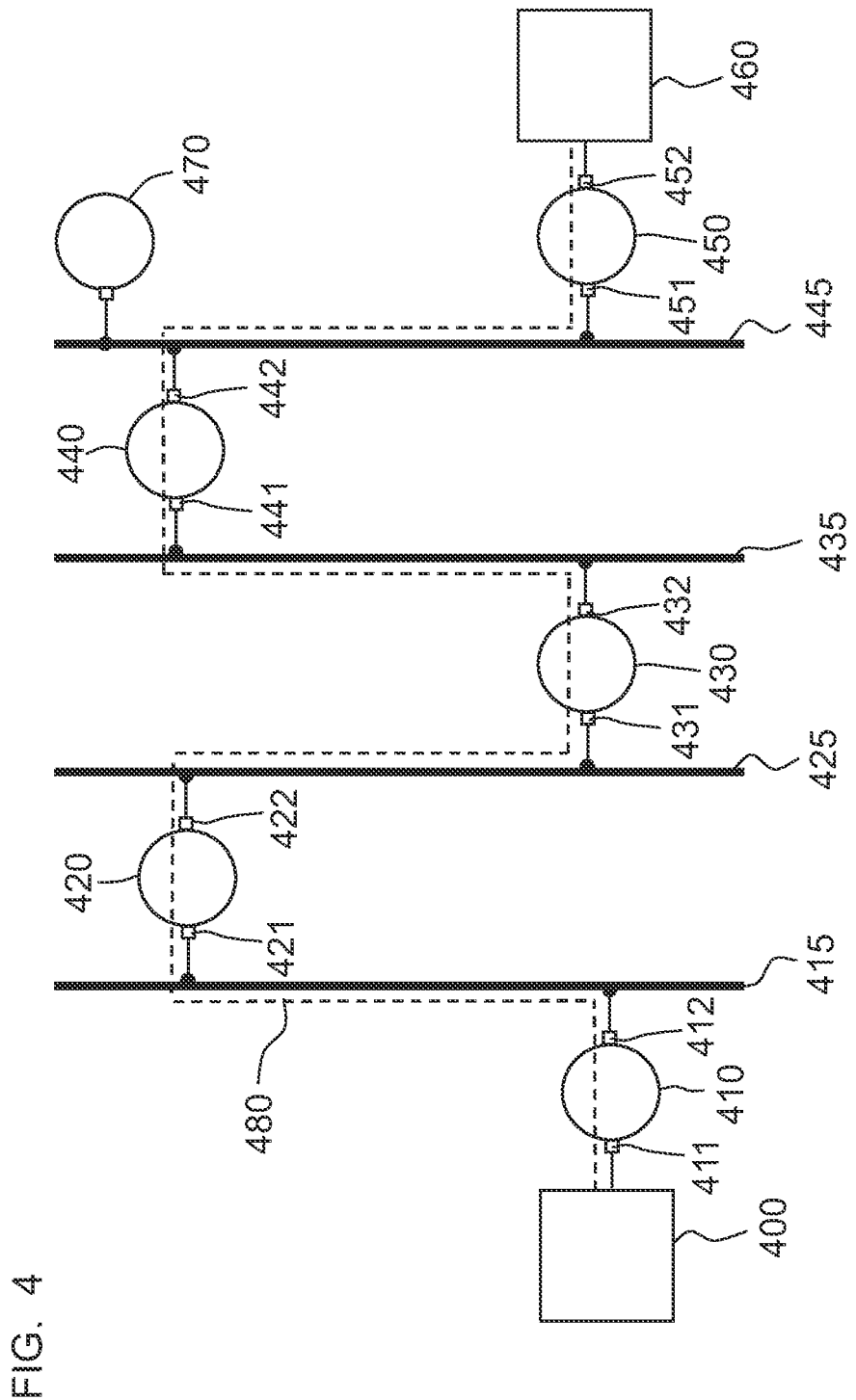
FIG. 4 illustrates an exemplary multicast communication system.

FIG. 4 shows a simplified example of a multicast communications system in which six PIM-SM routers 410, 420, 430, 440, 450 and 470 operate. A source 400 sending a multicast channel (S,G) is connected to the router 410, which transmits said multicast channel by means of PIM-SM routers 410, 420, 430 and 440, until reaching router 450 which is connected to a host 460 that wishes to receive said channel (S,G). The host 460 indicates to router 450 the multicast traffic that it wishes to receive. To that end, the host 460 and router 450 communicate by means of the IGMPv3 protocol or the MLDv2 protocol.

Router 440 and router 450 are connected to one another by means of a local multi-access network 445, for example an Ethernet network, to which other PIM-SM routers can be connected. The figure only shows one other PIM-SM router 470 connected to the multi-access network 445, but there can obviously be more PIM-SM routers connected to said network 445. In the same manner there is another local multi-access network 435 between routers 440 and 430, another multi-access network 425 between routers 430 and 420 and another multi-access network 415 between routers 420 and 410. In each of these multi-access networks 415, 425 and 435 there can be other PIM-SM routers connected thereto which are not shown in the figure for the sake of simplifying it.

In the example, each router 410, 420, 430, 440 and 450 has an upstream network interface, respectively 411, 421, 431, 441 and 451, and a downstream network interface, respectively 412, 422, 432, 442 and 452.

The multicast channel (S,G) is transmitted from the source 400 towards the host 460 following the path 480 indicated with a dotted line going through routers 410, 420, 430, 440 and 450 of the figure until reaching the host 460.

The PIM-SM messages follow the same path 480, but in the opposite direction of the data going from the source 400 to the host 460 receiving said traffic, and they are transmitted from router 450 towards router 410 passing through intermediate routers 440, 430 and 420. In the case of the multicast channel (S,G) sent by the source 400 of FIG. 4, the PIM-SM messages can be JOIN(S,G)-type messages to request receiving the traffic from source 400 or PRUNE(S,G)-type messages to request no longer receiving the traffic from source 400.

Assuming that host 460 is initially receiving the multicast channel (S,G) transmitted by the source 400, the process taking place when the host 460 sends an IGMPv3 or MLDv2 message to the router 450 to indicate that it wishes to stop receiving the traffic of said channel (S,G) will be analyzed below. When this occurs, the router 450 sends a PRUNE(S,G) message to the router 440 to indicate to it that it no longer wishes to receive the channel (S,G). Said PRUNE(S,G) message is transmitted through network interface 451 of router 450 by means of multi-access network 445 and is received through network interface 442 of router 440.

In the prior art, the router 440 waits for 3 seconds to see if there is any router that is still interested in receiving channel (S,G), in which case said interested router must immediately send to router 440 a JOIN(S,G) message before the three seconds elapse so that router 440 can thus continue transmitting traffic (S,G). If the three seconds elapse and no router connected to the network 445 sends a JOIN(S,G) message, router 440 will stop transmitting the multicast channel (S,G) through its network interface 442 and will transmit another PRUNE(S,G) message towards router 430 by means of the multi-access network 435. The same process is repeated in the next routers 430 and 420, which send successive PRUNE (S,G) messages. Three seconds of a wait are added in each router to check if in each multi-access network 435, 425 there is any other router interested in receiving the channel (S,G). The final result is that in the prior art, from when router 450 sends the first PRUNE(S,G) message until router 410 stops transmitting the channel (S,G), there is a total delay of 12 seconds (3 seconds successively in each of the routers) during which time router 410 has unnecessarily continued to transmit the traffic of channel (S,G).

The solution adopted by this invention to completely eliminate this latency problem consists in that the PIM-SM router, which receives through network interface a PIM-SM message from another router requesting multicast traffic, identifies and stores the IP address of the router of origin of said PIM-SM message. The IP address of origin of the PIM-SM messages is obtained from the Source Address field of the IP packets transporting said PIM-SM messages. The router of this invention thus knows exactly, for each of its network interfaces, which equipment is interested in receiving each type of multicast traffic at all times. By performing individual control of the traffic requested by each router, when the PIM-SM router according to the invention receives a PRUNE-type message to stop transmitting a specific multicast traffic, said router no longer needs to wait a certain time to see if another router sends a JOIN-type message in relation to the same multicast traffic, because it knows exactly which multicast traffic is requested by each router. If the router knows that there is no other router that wishes to receive said multicast traffic, it can immediately cancel the transmission thereof, thereby completely eliminating the latency.

An improved router according to the invention performs a function that RFC 4601 specifications, at the end of section 4.5.7, assert is impossible, i.e. performing individual tracking of the multicast traffic requests from the downstream routers without first eliminating message suppression in all the routers of the multi-access network. This invention thus changes the importance of message suppression in the individual control of traffic requests from downstream routers: it has gone from being somewhat essential for a person skilled in the art, following RFC 4601 specifications due to the complexity of the PIM-SM protocol, to being somewhat relatively unimportant for a person skilled in the art applying this invention.

As provided in RFC 4601, if message suppression is performed, a PIM-SM router cannot perform individual tracking of the multicast traffic requested by each downstream router. In keeping with this established idea, a person skilled in the art will think that if message suppression is performed, a PIM-SM router according to the invention will not be able to keep the information of the multicast traffic requested by each downstream router updated.

The improved PIM-SM router according to the invention, which stores the IP address of all the equipment requesting multicast traffic and precisely tracks the multicast traffic requested by each equipment, has to solve the problem involving message suppression to keep said information updated. This invention solves this problem as a result of the fact that it uses features of the PIM-SM protocol that are not explained in RFC 4601 specifications but which the applicant has deduced from a detailed observation of the upstream state machine (S,G) appearing in section 4.5.7 of said specifications. These features will be briefly described below.

A PIM-SM router has an independent upstream state machine (S,G) for each network interface of the router and for each multicast channel (S,G). This upstream state machine (S,G) has only two states: a Not_Joined (NJ) state meaning that the router does not need to receive the multicast channel (S,G) through said network interface, and a Joined (J) state meaning that the router needs to receive the multicast channel (S,G) through said network interface. It is not considered necessary to explain in detail the operation of the upstream state machine (S,G) used to send Join(S,G) messages in the PIM-SM protocol, because it is already explained in mentioned section 4.5.7 of RFC 4601. The features of the PIM-SM protocol that the applicant has deduced from the detailed analysis of said upstream state machine (S,G), and which are used by this invention, are the following:

When going from a Not Joined (NJ) state to a Joined (J) state, a PIM-SM router always sends a JOIN(S,G) message.

When going from a Joined (J) state to a Not Joined (NJ) state, a PIM-SM router always sends a PRUNE(S,G) message.

As a result of these two features the following feature is true:

To each initial JOIN-type message sent by a specific PIM-SM router to request specific multicast traffic will always correspond a final PRUNE-type message coming from the same router when the latter wishes to stop receiving said multicast traffic.

Therefore, a router executing the PIM-SM protocol always sends an initial JOIN(S,G) message when the router wishes to start receiving traffic of the multicast channel (S,G) and always sends a final PRUNE(S,G) message when said router wishes to stop receiving said multicast channel. The JOIN(S,G)-type messages that the PIM-SM router can suppress are only the periodical JOIN(S,G)-type messages that are re-sent when the timer called "Join_Timer" expires, but the initial JOIN(S,G) message is never suppressed.

This is also the case independently of whether or not message suppression is activated. As a result of these features of the PIM-SM upstream state machine, the router according to this invention can exactly track the multicast traffic that each PIM-SM router wants, both if message suppression is activated and if it is not, and it is not necessary for all the routers to agree to eliminate message suppression as required in RFC 4601.

The router according to the invention uses these features in the following manner: it performs the individual tracking of the multicast traffic requested by each downstream router, for example traffic (S,G), using the initial JOIN(S,G) message received from each router and the final PRUNE(S,G) message received from each router. As a result, a router according to the invention applying the PIM-SM protocol can perform said individual tracking of the multicast traffic even though the periodical JOIN(S,G) messages that the other routers send between an initial JOIN(S,G) message and a final PRUNE(S,G) message are suppressed.

Therefore, a router according to the invention applying the PIM-SM protocol can track the multicast traffic requested by each downstream router, both if message suppression is activated and if it is not, in contrast with what is provided in RFC 4601. Furthermore, and also in contrast with what is provided in RFC 4601, to that end it is not necessary for all the routers to agree to cancel message suppression.

In summary, a router according to the invention is suitable for operating in a communications network according to the PIM-SM protocol in which the other routers can be both routers according to the invention and routers according to the prior art, and said router according to the invention can perform individual tracking of the multicast traffic requested by the other routers independently of whether or not the routers according to the prior art have cancelled message suppression.

In the prior art, the routers applying the PIM-SM protocol send periodic JOIN(S,G) messages to prevent, if a final PRUNE(S,G) message is lost, the upstream router that has not received said lost PRUNE(S,G) message from continuing to transmit channel (S,G) indefinitely towards a network even though there is no router interested in receiving said channel. The upstream router updates a timer called Expiry_Timer every time it receives a JOIN(S,G) message, whether it is the initial message or one of the periodic messages. When the Expiry_Timer reaches zero, the router stops transmitting channel (S, G).

In the router of this invention, which performs individual tracking of the multicast traffic requested by each router, for example traffic (S,G), using the first JOIN(S,G) message received from each router and the PRUNE(S,G) message received from each router, it is also appropriate to use a timer that prevents a specific multicast traffic from continuing to be indefinitely transmitted if an IP packet transporting a PRUNE message is lost. The detailed operation of this timer implemented in this invention is explained below.

Even though the preceding explanations relate to the type of multicast traffic (S,G) and to the corresponding PIM-SM JOIN/PRUNE (S,G)-type messages, the explanation can be applied to the three other types of multicast traffic and to their corresponding PIM-SM messages which, as known by the person skilled in the art, are the following:

Traffic (*,*,RP); JOIN/PRUNE (*,*,RP)-type messages
Traffic (*,G); JOIN/PRUNE (*,G) messages
Traffic (S,G,rpt); JOIN/PRUNE (S,G,rpt) messages Table 6 shows the operation of the downstream state machine (S,G) of a router according to the invention, i.e. the state machine managing the control of the state of the multicast traffic (S,G) depending on the JOIN/PRUNE (S,G) messages received through each network interface of said router. The person skilled in the art will easily understand that the concepts explained below for the state machine (S,G) and the JOIN/PRUNE (S,G)-type messages can also be applied to the three other types of multicast traffic and to their corresponding PIM-SM messages.

The state machine of Table 6 stores the state information of each type of multicast traffic requested in records having the following form:

RECORD (Interface, Traffic_Type=(S,G), Expiry_Timer, {(IP_Router, IP_Timer)}); where:

Interface is the network interface of the router in which the PIM-SM messages are received.

Traffic_Type is a parameter indicating the type of multicast traffic. The state machine of Table 6 relates to the type of traffic (S,G), where S is the IP address of origin of the source and G the IP address of the multicast group. This is why Traffic_Type=(S,G) has been indicated. However, it could also be any other of the four types of multicast traffic mentioned above.

Expiry_Timer or ET is a timer that restarts every time a JOIN-type message relating to the type of traffic indicated in the Traffic_Type field reaches the network interface indicated in the Interface field. If the Expiry_Timer reaches zero, the router stops transmitting the traffic indicated in the Traffic_Type field (in this case the traffic (S, G)) through the network interface indicated in the Interface field.

{(IP_Router, IP_Timer)} is a list of elements (IP_Router, IP_Timer), wherein IP_Router is the IP address of the router that has sent the PIM-SM message and wherein IP_Timer is a timer associated to each IP_Router which restarts every time the network interface indicated in the Interface field receives a JOIN-type message from the router the IP of which is IP_Router. The value used to restart timer IP_Timer is the value of the holdtime parameter contained in the JOIN(S,G) message. The holdtime parameter is a parameter transmitted in the JOIN(S,G) messages of the PIM-SM protocol, in a manner known by a person skilled in the art, and indicating the time that the router sending the JOIN message(S,G) wishes to be receiving channel (S,G). The IP address of the router that has sent the PIM-SM message is extracted from the address of origin of the IP datagram encapsulating said PIM-SM message.

In the state machine of Table 6, which as mentioned relates to a specific network interface of the router and a specific type of multicast traffic (in this case the traffic of type (S,G)), the first column contains an initial state of the router, the second column contains a message or event, the third column contains the final state of the router as a result of said message or event of the second column and the fourth column contains the actions that the router performs in each case.

A downstream network interface of the router can be in the following two states for a specific multicast channel (S, G):

NI (No_Info). This state indicates that the network interface of the router has no information indicating to the router that it should transmit channel (S,G) through said network interface. Therefore, in the NI state the router does not transmit channel (S,G).

JOIN ({IP}), where {IP} is a list of IP addresses of PIM-SM routers that have sent to the router JOIN(S,G)-type messages. In this state, the router is transmitting channel (S,G) through said network interface because there is a series of routers that have requested it (the routers of the {IP} list).

Table 6 describes eight processes numbered from 1 to 8 and separated from one another by dotted lines. These eight processes form the downstream (S,G) state machine of the router of this invention.

Process 1 is executed when the router is in NI state and receives a JOIN(S,G) message from a router the IP of which is IP1. The router switches to the JOIN (IP1) state and initializes the timer T(IP1) associated to the IP1 address and the timer Expiry_Timer or ET with the value of the holdtime parameter contained in the JOIN(S,G) message received. The router begins to transmit the multicast channel (S,G) through the network interface through which it has received said JOIN (S,G) message.

The holdtime parameter of the PIM-SM messages is described in section "4.9.5 Join/Prune Message Format" of RF 4601, and indicates the time in seconds during which the router receiving the message must maintain the Joined or Pruned state.

In process 2, the router is already transmitting channel (S,G) and receives a new JOIN(S,G) message from a router the IP of which, indicated as IP2, is not in its list of IP addresses of the record associated to channel (S,G). In this case, the router adds the IP2 address to its list and starts the value of the timer T(IP2) with the value of the holdtime parameter of the message received. If the value of the ET timer is greater than the holdtime parameter contained in the JOIN(S,G) message received, the ET timer is not modified. In the opposite case, i.e. when the ET timer has a value that is less than holdtime, this holdtime value is put in the ET timer. This operation has been indicated in Table 6 by means of the expression "ET->HT". In this second process, the router keeps transmitting channel (S,G).

In process 3, the router receives a JOIN(S,G) message from a router the IP of which, which in this case is IP1, is already in its list. In this case it simply updates the timers T(IP1) and ET as explained in process 2, and keeps transmitting channel (S,G).

In process 4, the router receives a PRUNE(S,G) message from a router the IP address of which, which in this case is IP2, is in its list, but IP2 is not the only element of its list. The router eliminates IP2 from its list and keeps transmitting channel (S,G).

In process 5, the router receives a PRUNE(S,G) message from a router the IP address of which, which in this case is IP1, is the last address in the record associated to the channel (S,G). In this case the router eliminates the IP1 address from the list, stops transmitting the channel (S,G) and switches to the NI state.

In process 6, the timer T(IP1) associated to IP1, which is the only element in the IP list, reaches the value zero. In this case, the router eliminates IP1 from the list, stops transmitting the channel (S,G) and switches to the NI state.

In process 7, the timer T(IP2) associated to an IP2, which is not the only element of the list, reaches the value zero. In this case, the router must take into account whether or not the router sending the PIM-SM messages from the IP2 address is a router that has cancelled message suppression. In the first case, the router eliminates the IP2 address from the list and in the second case maintains the IP2 address even though the timer T(IP2) is zero. How a router implementing this invention knows if the other routers have cancelled message suppression will be described below.

Process 8 shows what happens when the ET timer reaches zero. In this case, the router eliminates all the IPs from the list, switches to the NI state and stops transmitting channel (S,G).

Routers implementing this invention can be configured to always cancel periodic message suppression, even though there are routers in the network that have not announced their capacity to cancel message suppression.

Furthermore, routers implementing this invention have a mechanism for knowing whether or not the other routers of a network implement this invention. This is convenient for two reasons.

In the first place, a downstream router implementing this invention needs to know whether or not an upstream router it sends PIM-SM messages to implements this invention. For example, if a router R1 implementing this invention sends JOIN messages to a router R2, router R1 needs to know if router R2 implements this invention because if router R2 is from the prior art and another router R3 sends a PRUNE message to router R2 relating to multicast traffic that router R1 wishes to keep receiving, router R1 must immediately send a JOIN message to cancel the effect of the PRUNE message of router R3. However, if router R2 implements this invention, router R1 does not have to worry about the messages sent by the other routers because router R2 performs individual tracking of the requests of each router.

In the second place, an upstream router implementing this invention needs to know whether or not a downstream router sending PIM-SM messages to it implements this invention and if the downstream router has cancelled message suppression even though not all the routers have agreed to cancel message suppression.

In the default mechanism of the prior art, as described in RFC 4601, the routers do not announce whether or not they have cancelled message suppression; they announce if they have the capacity to cancel message suppression. Only when all the routers of a network have announced that they have the capacity to cancel message suppression do all the routers commonly cancel message suppression.

In process 7 of Table 6, the upstream router knows that the downstream router has cancelled message suppression if either of the following two circumstances occurs:

(a) the downstream router has communicated that it is a router implementing this invention and whether or not it cancels the periodic messages; or
(b) all the routers of the network have announced their capacity to cancel message suppression.

To communicate that they implement this invention and whether or not they suppress periodic messages, the routers of this invention can announce it in their Hello messages they periodically send through all their network interfaces where they execute the PIM-SM protocol.

A first way to announce it consists of defining a new data block of the type called Option with a new OptionType value in the Hello message. The different values of the OptionType parameter of the Hello messages are explained in section 4.9.2 of RFC 4601 and currently range from 1 to 20. A value outside this range, for example OptionType=30, can be used to announce that a router implements this invention and one of the fields or parameters of the new message can be used to indicate if the router has cancelled periodic message suppression.

A second way of announcing this capacity consists of using the LAN_PRUNE_Delay data block and putting a special value in the Override_Interval parameter, for example the values 0 and 1 which make little sense as a wait value in milliseconds. Therefore, for example, when the routers of this invention receive a Hello message the Override_Interval value of which is 0, they know it is sent by a router that implements this invention and has cancelled message suppression. If they receive the value 1, they interpret that the router that has sent the message implements this invention but it has not cancelled message suppression.

Again in reference to the example of the FIG. 4, assume that routers 410, 420, 430, 440 and 450 are routers implementing this invention. When the host 460 sends a IGMPv3 or MLDv2 message to router 450 to indicate that it wishes to stop receiving traffic of channel (S,G), router 450 sends a PRUNE(S,G) message to router 440. According to the invention, router 440 maintains a record of traffic (S,G) requested in its network interface 442 for each of the routers of the multi-access network line 445 that have requested traffic by sending PIM-SM messages to said router 440. As a result, router 440 knows if there is a router that still wishes to receive channel (S;G). If this is not the case, when router 440 receives the PRUNE(S,G) message sent by router 450, it immediately performs the following actions: it stops transmitting multicast traffic through its downstream network interface 442 and sends a PRUNE(S,G) message to router 430. The same process occurs successively in routers 430 and 420: when each of them receives the PRUNE(S,G) message from the downstream router, if its record for traffic (S,G) requested in its downstream network interface, respectively 432 and 422, indicates that there is no router interested in receiving channel (S,G), said router 430, 420 immediately stops sending traffic through its said downstream network interface and sends a PRUNE(S,G) message to the next upstream router. When router 410 receives the PRUNE(S,G) message from router 420, it performs the same process as routers 440, 430 and 420, the difference being that it does not send a PRUNE(S,G) message, because it is directly connected to the source 400. Therefore, after the moment in which router 450 sends the first PRUNE(S,G) message, if in the multi-access network lines 445, 435, 425 and 415 there is no other router interested in receiving channel (S,G), router 410 stops transmitting channel (S,G) virtually immediately. In fact, the only delay occurring, in addition to the delay inherent to the transmission of the PRUNE messages through the network, which is done in a very short time and is inevitable anyway, is the delay corresponding to the time necessary for each router to update and check its records of requested multicast traffic, according to the invention. However, these are operations that a router can perform in extremely short times, as is known by a person skilled in the art.

The individual tracking of the requests of each PIM-SM router performed as a result of the router according to the invention has other important applications in addition to the advantages already explained. For example, it allows accounting for or authorizing multicast traffic, which is generally called AAA (Authentication, Authorization and Accounting). This can advantageously be carried out, for example, by associating information relating to the AAA a each element (IP_Router, IP_Timer) of the list {(IP_Router, IP_Timer)} of the record of multicast traffic of each router. An improved router according to the invention can thus apply specific conditions relating to the accounting and/or to the authorization for the transmission of a type of multicast traffic to a specific router, identified by the IP_Router address and for which said improved router has information stored relating to the AAA.

TABLE 2

| STATUS 1 | MESSAGE | STATUS 2 | ACTIONS |
|---|---|---|---|
| 1. INCLUDE (A) | IS_IN (B) | INCLUDE (A + B) | T(B) = GMI |
| 2. INCLUDE (A) | IS_EX (B) | EXCLUDE (A * B, B − A) <br> DEL(A − B) <br> GT = GMI | T(B − A) = 0 |
| 3. EXCLUDE (X, Y) | IS_IN (A) | EXCLUDE (X + A, Y − A) | T(A) = GMI |
| 4. EXCLUDE (X, Y) | IS_EX (A) | EXCLUDE (A − Y, Y * A) <br> DEL (X − A) <br> DEL (Y − A) <br> GT = GMI | T(A − X − Y) = GMI |
| 5. INCLUDE (A) | ALLOW (B) | INCLUDE (A + B) | T(B) = GMI |
| 6. INCLUDE (A) | BLOCK (B) | INCLUDE (A) | SEND Q(G, A * B) |
| 7. INCLUDE (A) | TO_EX (B) | EXCLUDE (A * B, B − A) <br> DEL (A − B) <br> SEND Q(G, A * B) <br> GT = GMI | T(B − A) = 0 |
| 8. INCLUDE (A) | TO_IN (B) | INCLUDE (A + B) <br> SEND Q(G, A − B) | T(B) = GMI |
| 9. EXCLUDE (X, Y) | ALLOW (A) | EXCLUDE (X + A, Y − A) | T(A) = GMI |
| 10. EXCLUDE (X, Y) | BLOCK (A) | EXCLUDE (X + (A − Y), Y) <br> SEND Q(G, A − Y) | T(A − X − Y) = GT |
| 11. EXCLUDE (X, Y) | TO_EX (A) | EXCLUDE (A − Y, Y * A) <br> DEL (X − A) <br> DEL (Y − A) <br> SEND Q(G, A − Y) <br> GT = GMI | T(A − X − Y) = GT |
| 12. EXCLUDE (X, Y) | TO_IN (A) | EXCLUDE (X + A, Y − A) <br> SEND Q(G, X − A) <br> SEND Q(G) | T(A) = GMI |

TABLE 3

| MESSAGE SENT BY THE HOST | SOURCES WITH TRAFFIC TRANSMITTED BY THE ROUTER | ACTION PERFORMED BY THE ROUTER |
|---|---|---|
| INCLUDE(S1) | S1 | T(S1) = GMI |
| ALLOW(S2) | S1, S2 | T(S1) = GMI |
| BLOCK(S1) | S1, S2 | T(S1) = LMQT; SEND Q(G, S1) |
| ALLOW(S3) | S1, S2, S3 | T(S3) = GMI |
| BLOCK(S2) | S1, S2, S3 | T(S2) = LMQT; SEND Q(G, S2) |

TABLE 4

| | STATUS 1 | MESSAGE | STATUS 2 | ACTIONS |
|---|---|---|---|---|
| 1. | INCLUDE (A) | IS_IN (B) | INCLUDE (B) DEL(A − B) | T(B) = GMI |
| 2. | INCLUDE (A) | IS_EX (B) | EXCLUDE ({ }, B) DEL(A − B) GT = GMI | T(B) = 0 |
| 3. | EXCLUDE (X, Y) | IS_IN (A) | INCLUDE (A) DEL(X + Y) − A | T(A) = GMI |
| 4. | EXCLUDE (X, Y) | IS_EX (A) | EXCLUDE ({ }, A) DEL(X + Y) − A GT = GMI | T(A) = 0 |
| 5. | INCLUDE (A) | ALLOW (B) | INCLUDE (A + B) | T(B) = GMI |
| 6. | INCLUDE (A) | BLOCK (B) | INCLUDE (A − B) | DEL(B) |
| 7. | INCLUDE (A) | TO_EX (B) | EXCLUDE ({ }, B) DEL (A − B) GT = GMI | T(B) = 0 |
| 8. | INCLUDE (A) | TO_IN (B) | INCLUDE (B) DEL(A − B) | T(B) = GMI |
| 9. | EXCLUDE (X, Y) | ALLOW (A) | EXCLUDE (X + A, Y − A) | T(A) = GMI |
| 10. | EXCLUDE (X, Y) | BLOCK (A) | EXCLUDE (X − A, Y + A) | T(A) = 0 |
| 11. | EXCLUDE (X, Y) | TO_EX (A) | EXCLUDE ({ }, A) DEL (X + Y) − A GT = GMI | T(A) = 0 |
| 12. | EXCLUDE (X, Y) | TO_IN (A) | INCLUDE (A) DEL (X + Y) − A | T(A) = GMI |

TABLE 5

| | STATUS 1 | MESSAGE | STATUS 2 | ACTIONS |
|---|---|---|---|---|
| 1. | INCLUDE (A) EXCLUDE (Y) | IS_IN (B) | INCLUDE (B) EXCLUDE (Y) | T(B) = GMI DEL(A − B) |
| 2. | INCLUDE (A) EXCLUDE (Y) | IS_EX (B) | INCLUDE (A) EXCLUDE (B) | DEL(Y − B) GT = GMI |
| 3. | INCLUDE (A) EXCLUDE (Y) | ALLOWIN (B) | INCLUDE (A + B) EXCLUDE (Y) | T(B) = GMI |
| 4. | INCLUDE (A) EXCLUDE (Y) | BLOCKIN (B) | INCLUDE (A − B) EXCLUDE (Y) | DEL(B) |
| 5. | INCLUDE (A) EXCLUDE (Y) | ALLOWEX (B) | INCLUDE (A) EXCLUDE (Y − B) | DEL(B) |
| 6. | INCLUDE (A) EXCLUDE (Y) | BLOCKEX (B) | INCLUDE (A) EXCLUDE (Y + B) | |

TABLE 6

| | STATUS 1 | MESSAGE/ EVENTO | STATUS 2 | ACTIONS |
|---|---|---|---|---|
| 1. | NI | JOIN(S, G) FROM(IP1) | JOIN(IP1) | T(IP1) = HT ET = HT |
| 2. | J(IP1) | JOIN(S, G) FROM(IP2) | JOIN(IP1, IP2) | T(IP2) = HT ET -> HT |
| 3. | J(IP1) | JOIN(S, G) FROM(IP1) | JOIN(IP1) | T(IP1) = HT ET -> HT |
| 4. | J(IP1, IP2) | PRUNE(S, G) FROM(IP2) | JOIN(IP1) | DEL (IP2) |
| 5. | J(IP1) | PRUNE(S, G) FROM (IP1) | NI | DEL (IP1) |
| 6. | J(IP1) | T(IP1) = 0 | NI | DEL (IP1) |
| 7. | J(IP1, IP2) | T(IP2) = 0 JOIN(IP1, IP2) | JOIN(IP) DEL (IP2) | IF [NSP(IP2)] |
| 8. | J( . . . ) | ET = 0 | NI | DEL ALL IP |

The meaning of the abbreviations in Table 6 is as follows:

| | |
|---|---|
| NI | "No Info" status |
| J | "JOIN" status referred to the indicated IP addresses |
| T | timer related to the indicated IP address |
| ET | "Expiry_Timer" |
| HT | value of the "Holdtime" parameter in the JOIN message received |
| FROM | message sent from the indicated IP address |
| DEL | delete the indicated IP address from the record |
| DELL ALL IP | delete all IP addresses from the record |
| NSP | the router at the indicated IP address does not suppress messages |
| IF | the action is performed if the condition indicated is met |

The invention claimed is:

1. A method to monitor a multicast router comprising a Simple Network Management Protocol (SNMP) agent and an SNMP database, the method comprising:
   a) the multicast router receiving via a downstream network interface, multicast data requests made by one or more hosts;
   b) the multicast router reading data contained in the multicast data request;
   c) the multicast router storing first data in the SNMP database for a downstream network interface, a multicast group address and a first host that requests multicast data, the first data comprising information of the multicast groups and multicast channels requested by the first host; and
   d) the Simple Network Management Protocol (SNMP) agent of the multicast router transmitting to an SNMP control station, using a version of the SNMP protocol, at least a part of the first data stored in the SNMP database.

2. The method according to claim 1 further comprising the multicast router requesting the multicast data requested by the hosts by transmitting to a second multicast router multicast routing messages in a version of the Protocol Independent Multicast (PIM) protocol.

3. The method according to claim 1, wherein the first data comprises identifying data of the first host, a multicast group address and source address information.

4. The method according to claim 1, wherein the multicast data requests are based on a version of the Internet Group Management Protocol (IGMP) or the Multicast Listener Discovery (MLD) protocol.

5. The method according to claim 1, wherein the SNMP database is a Management Information Base (MIB) database.

* * * * *